United States Patent
Ruan et al.

(10) Patent No.: US 10,938,563 B2
(45) Date of Patent: Mar. 2, 2021

(54) TECHNOLOGIES FOR PROVISIONING CRYPTOGRAPHIC KEYS

(71) Applicant: Intel Corporation, Santa Clara, CA (US)

(72) Inventors: Xiaoyu Ruan, Folsom, CA (US); Vincent Von Bokern, George Town (MY); Daniel Nemiroff, El Dorado Hills, CA (US)

(73) Assignee: INTEL CORPORATION, Santa Clara, CA (US)

( * ) Notice: Subject to any disclaimer, the term of this patent is extended or adjusted under 35 U.S.C. 154(b) by 78 days.

(21) Appl. No.: 15/640,118

(22) Filed: Jun. 30, 2017

(65) Prior Publication Data
US 2019/0007209 A1    Jan. 3, 2019

(51) Int. Cl.
| | | |
|---|---|---|
| *H04L 9/30* | (2006.01) | |
| *G11B 20/00* | (2006.01) | |
| *H04L 9/08* | (2006.01) | |
| *G06F 21/12* | (2013.01) | |
| *G06F 17/11* | (2006.01) | |

(52) U.S. Cl.
CPC ........ *H04L 9/302* (2013.01); *G11B 20/00811* (2013.01); *H04L 9/0833* (2013.01); *G06F 17/11* (2013.01); *G06F 21/121* (2013.01); *H04L 9/085* (2013.01)

(58) Field of Classification Search
CPC ....... H04L 9/302; H04L 9/0833; H04L 9/085; G11B 20/00811; G06F 17/11; G06F 21/121

USPC ......................................................... 380/30
See application file for complete search history.

(56) References Cited

U.S. PATENT DOCUMENTS

| | | | | |
|---|---|---|---|---|
| 5,539,684 | A * | 7/1996 | Quintana | G06F 5/012 708/500 |
| 6,023,509 | A * | 2/2000 | Herbert | G06Q 20/04 380/29 |
| 7,739,521 | B2* | 6/2010 | Brickell | G06F 7/723 380/30 |
| 9,893,885 | B1* | 2/2018 | Miller | H04L 9/0891 |
| 2001/0055388 | A1* | 12/2001 | Kaliski, Jr. | H04L 9/088 380/30 |
| 2006/0083370 | A1* | 4/2006 | Hwang | H04L 9/0891 380/28 |
| 2010/0040236 | A1* | 2/2010 | Xu | H04L 9/0833 380/279 |
| 2010/0316215 | A1* | 12/2010 | Bergsten | H04L 9/0841 380/29 |
| 2011/0061105 | A1* | 3/2011 | Cuypers | G06F 7/72 726/26 |

(Continued)

*Primary Examiner* — Shewaye Gelagay
*Assistant Examiner* — Moeen Khan
(74) *Attorney, Agent, or Firm* — Jaffery Watson Mendosa & Hamilton LLP

(57) ABSTRACT

Technologies for provisioning cryptographic keys include hardcoding identical cryptographic key components of a Rivest-Shamir-Adleman (RSA) public-private key pair to each compute device of a plurality of compute devices. A unique cryptographic exponent that forms a valid RSA public-private key pair with cryptographic key components hardcoded into each compute device is provided to each compute device so that each compute device has a unique public key. The public key of each compute device may be used to provision unique secrets to the corresponding compute device.

22 Claims, 11 Drawing Sheets

(56) References Cited

U.S. PATENT DOCUMENTS

| | | | | |
|---|---|---|---|---|
| 2013/0159715 A1* | 6/2013 | Klassen | ............... | G06Q 20/347 713/171 |
| 2016/0043870 A1* | 2/2016 | Avanzi | ................... | H04L 9/302 713/176 |
| 2017/0338958 A1* | 11/2017 | Medvinsky | ........... | H04L 9/3263 |

* cited by examiner

TECHNOLOGIES FOR PROVISIONING CRYPTOGRAPHIC KEYS

BACKGROUND

Cryptographic keys are used in many security applications by various compute devices to encrypt and decrypt data. In some implementations, cryptographic keys may be used between two devices to establish a shared secret, which may be unique to the receiving compute device. For example, a typical media player may include a security component to enforce content access privileges on that particular media player using a Digital Right Management (DRM) key that is unique to that particular media player. Because the DRM key (i.e., the shared secret) is unique on each media player, a user cannot share the DRM key to allow access to protected media on non-authorized devices.

Some cryptographic security schemes rely on a Rivest-Shamir-Adleman (RSA) public-private key pair, which includes cryptographic components that combine in particular ways to form the RSA public key and the RSA private key. Those cryptographic components include prime numbers p and q and exponent d, each of which is kept private. The cryptographic components also include a modulus n and exponent e, which are made public. The public key of an RSA public-private key pair is formed from the modulus n and public exponent e, and the private key of an RSA public-private key pair is formed from the modulus n and private exponent d. The public-private key pair can be used to establish a unique secret on a device.

In typical practice, the same private and public cryptographic components, p, q, n, and e (and sometimes d), are hardcoded into the firmware or hardware of each instance of a compute device (i.e., each compute device of the same type) because provisioning each instance with different firmware/hardware can be overly complex and cost ineffective. To provision a unique secret, each unique secret is encrypted using the global public key, which is decrypted by each compute device instance using the provisioned private key. However, because each compute device instance is provisioned with the same cryptographic components, each compute device instance can decrypt the encrypted, unique secret. That fact can cause security weaknesses in the provisioning system. For example, a stolen encrypted secret could be decrypted by a compromised compute device and used to provision a large number of non-authorized compute devices. Additionally, the same unique secret could be inadvertently provisioned to multiple compute device instance because each compute device can decrypt the same encrypted, unique secret.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
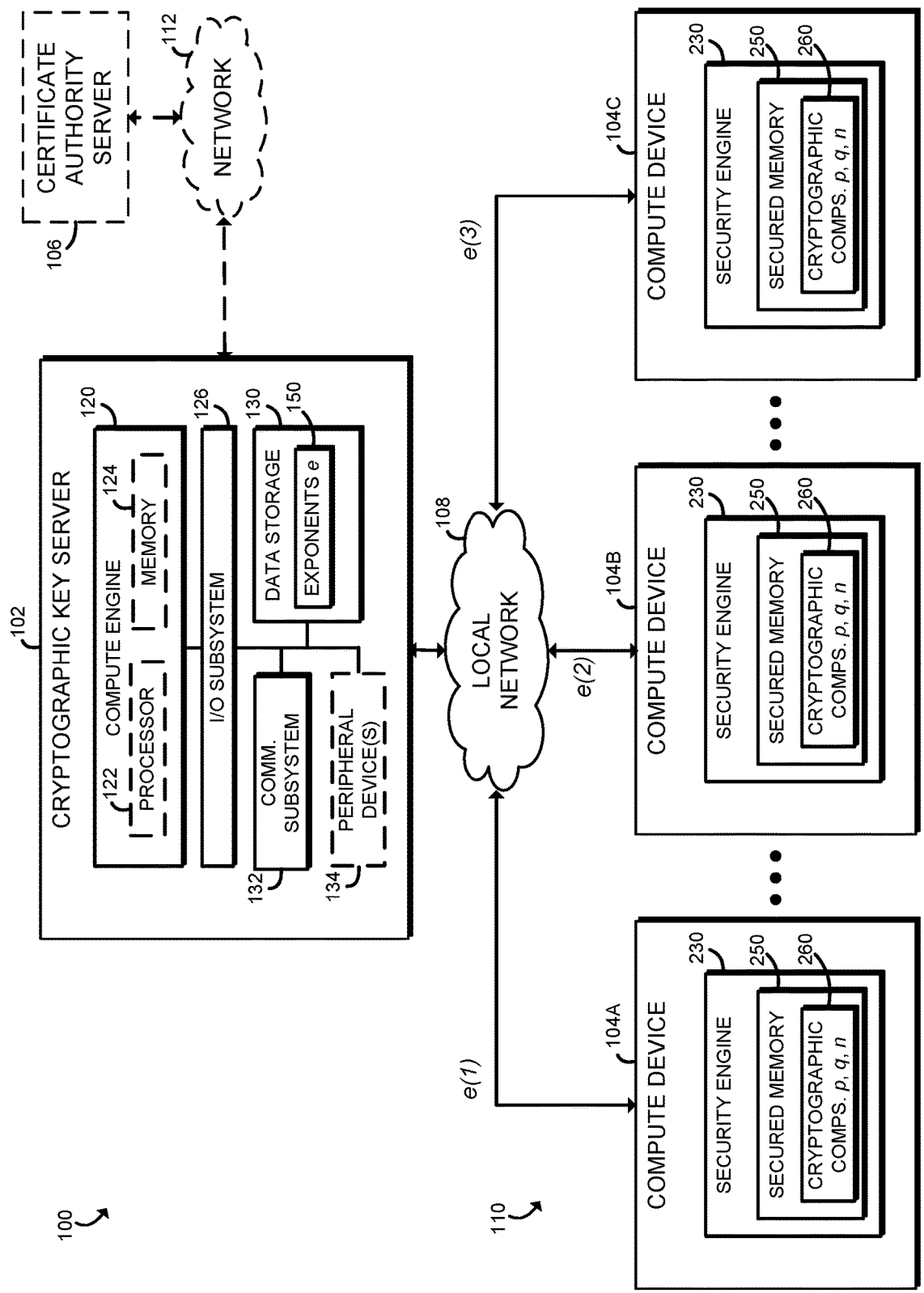
FIG. 1 is a simplified block diagram of at least one embodiment of a system for provisioning cryptographic keys to a group of compute devices.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C).

Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for provisioning cryptographic keys to a group 110 of compute devices 104 includes a cryptographic key server 102. In use, as discussed in more detail below, certain cryptographic key components of a Rivest-Shamir-Adleman (RSA) public-private key pair are hardcoded into each of the compute devices 104 (e.g., included in firmware stored on the compute devices 104 or stored in one-time-store memory) during an initialization phase. However, unlike typical RSA key pair provisioning, only the prime numbers, p and q, and the modulus, n, of the cryptographic key components are hardcoded onto the compute devices 104, while the cryptographic key server 102 subsequently provisions each compute device 104 with a different public exponent, e, during a provisioning phase as discussed in more detail below. For example, as shown in FIG. 1, each of the compute devices 104A, 104B, and 104C include cryptographic key components 260, p, q, and n, illustratively stored in a secured memory 250 of a security engine 230 of the corresponding compute device 104. Of course, the cryptographic key components 260 may be hardcoded in the firmware of the compute device 104 (e.g., in the firmware of the security engine 230) in other embodiments. Regardless, during a subsequent public exponent provisioning process, the cryptographic key server 102 provisions the compute device 104A with a public exponent, e(1), the compute device 104B with a public exponent, e(2), and the compute device 104C with a public exponent, e(3). Each of the public exponents, e(1), e(2), and e(3), are different from each other. As such, each compute device 104 includes identical prime numbers, p and q, and modulus, n, but a unique public exponent, e. In this way, each compute device 104 can generate a unique RSA public key, PUBKEY(n, e), which increases the security of the system 100 while provisioning secrets to the compute devices 104 because secrets encrypted with the public key of one compute device 104 cannot be decrypted with a different compute device 104.

The cryptographic key server 102 may be embodied as any type of server or other compute device capable of provisioning cryptographic key components of an RSA key pair to the group 110 of compute devices 104. For example, the cryptographic key server 102 may be embodied as, without limitation, one or more server computers, distributed computing systems, workstations, computers, desktop computers, laptop computers, notebook computers, tablet computers, mobile computing devices, network appliances, web appliances, processor-based systems, consumer electronic devices, and/or other compute devices. In the illustrative embodiment, the cryptographic key server 102 forms a portion of the manufacturing line of the compute devices 104, and is configured to generate cryptographic key components for the compute devices as discussed below. It should be appreciated that, although shown in FIGS. 1 and 3 as a single compute device, the cryptographic key server 102 may be embodied as multiple compute devices (e.g., multiple servers) in other embodiments.

As shown in FIG. 1, the illustrative cryptographic key server 102 includes a compute engine 120, an input/output ("I/O") subsystem 126, a data storage 130, and a communication subsystem 132. Of course, it should be appreciated that the cryptographic key server 102 may include other or additional components, such as those commonly found in a typical compute device (e.g., various input/output devices and/or other components), in other embodiments. Additionally, in some embodiments, one or more of the illustrative components may be incorporated in, or otherwise form a portion of, another component.

The compute engine 120 may be embodied as any type of device or collection of devices capable of performing various compute functions as described below. In some embodiments, the compute engine 120 may be embodied as a single device such as an integrated circuit, an embedded system, a field-programmable-array (FPGA, a system-on-a-chip (SOC), or other integrated system or device. Additionally, in some embodiments, the compute engine 120 includes or is embodied as a processor 122 and memory 124. The processor 122 may be embodied as any type of processor capable of performing the functions described herein. For example, the processor 122 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the cryptographic key server 102 such as operating systems, applications, programs, libraries, and drivers.

The compute engine 120 is communicatively coupled to other components of the cryptographic key server 102 via the I/O subsystem 126, which may be embodied as circuitry and/or components to facilitate input/output operations with compute engine 120 (e.g., with the processor 122 and/or memory 124) and other components of the cryptographic key server 102. For example, the I/O subsystem 126 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 126 may be incorporated, along with the processor 122, the memory 124, and other components of the cryptographic key server 102, into the compute engine 120.

The data storage 130 may be embodied as any type of device or devices configured for short-term or long-term storage of data such as, for example, memory devices and circuits, memory cards, hard disk drives, solid-state drives, or other data storage devices. As discussed in detail below, the cryptographic key server 102 is configured to generate a set of validated public exponents 150 (*e*) of the RSA cryptographic key components based on the cryptographic key components, p, q, n, hardcoded into each of the compute devices 104. The cryptographic key server 102 may store the generated set of validated public exponents 150 in the data storage 130 for provisioning to the compute devices 104 during a public exponent provisioning phase of the initialization of the group 110 of the compute devices 104.

The communication subsystem 132 may be embodied as any type of communication circuit, device, or collection thereof, capable of enabling communications between the cryptographic key server 102 and the compute devices 104 via a local network 108 and, in some embodiments, a certificate authority server 106 via a network 112. To do so, the communication subsystem 132 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

In some embodiments, the cryptographic key server 102 may also include one or more peripheral devices 134. The peripheral devices 134 may include any number of additional peripheral or interface devices, such as other input/output devices, storage devices, and so forth. The particular devices included in the peripheral devices 134 may depend on, for example, the type and/or configuration of the cryptographic key server 102.

Each of the compute devices 104 may be embodied as any type of compute device configured to utilize cryptographic keys for secure communications and/or control access to data. For example, each compute device 104 may be embodied as, without limitation, a media player, a smartphone, a digital book, a video device, a communication device, and/or any other type of compute device capable of utilizing cryptographic keys. In the illustrative embodiment, each of the compute devices 104 is instances of the same type of compute device. For example, each of the compute devices 104 may be media players of the same brand and type.

Figure 2:
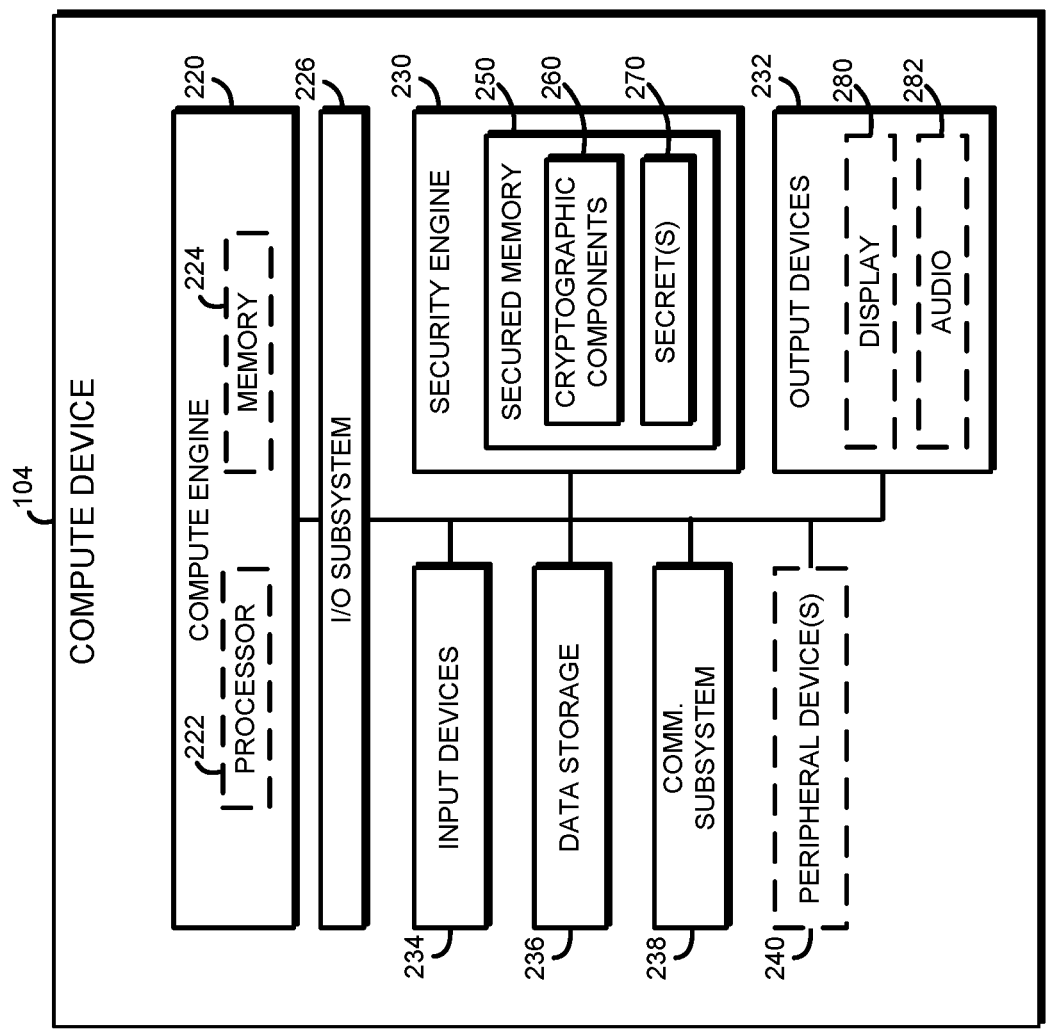
FIG. 2 is a simplified block diagram of at least one embodiment of a provisioned compute device of FIG. 1.

As shown in FIG. 2, each compute device 104 illustratively includes a compute engine 220, an input/output ("I/O") subsystem 226, a security engine 230, one or more output devices 232, input devices 234, a data storage 236, and a communication subsystem 238. Of course, it should be appreciated that the compute device 104 may include other or additional components, such as those commonly found in a typical compute device (e.g., various input/output devices and/or other components), in other embodiments. Additionally, in some embodiments, one or more of the illustrative components may be incorporated in, or otherwise form a portion of, another component.

Similar to the compute device 120 of the cryptographic key server, the compute engine 220 may be embodied as any type of device or collection of devices capable of performing various compute functions as described below. In some embodiments, the compute engine 220 may be embodied as a single device such as an integrated circuit, an embedded system, a field-programmable-array (FPGA), a system-on-a-chip (SOC), or other integrated system or device. Additionally, in some embodiments, the compute engine 220 includes or is embodied as a processor 222 and memory 224. The processor 222 may be embodied as any type of processor capable of performing the functions described herein. For example, the processor 222 may be embodied as a single or multi-core processor(s), digital signal processor, microcontroller, or other processor or processing/controlling circuit. Similarly, the memory 224 may be embodied as any type of volatile or non-volatile memory or data storage capable of performing the functions described herein. In operation, the memory 224 may store various data and software used during operation of the compute device 104 such as operating systems, applications, programs, libraries, and drivers.

The compute engine 220 is communicatively coupled to other components of the compute device 104 via the I/O subsystem 226, which may be embodied as circuitry and/or components to facilitate input/output operations with compute engine 220 (e.g., with the processor 222 and/or memory 224) and other components of the compute device 104. For example, the I/O subsystem 226 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 226 may be incorporated, along with the processor 222, the memory 224, and other components of the compute device 104, into the compute engine 220.

The security engine 230 may be embodied as any hardware component(s) or circuitry capable of providing security-related services to the compute device 104. For example, the security engine may be embodied as, or otherwise include, a cryptographic engine, a security co-processor, a Trusted Platform Module (TPM), a manageability engine, an out-of-band processor, a converged security and manageability engine (CSME), or other security engine device or collection of devices. In the illustrative embodiment, the security engine 230 is configured to perform cryptographic functions (e.g., encrypt and/or decrypt data using RSA key pairs) of the compute device 104. The illustrative security engine 230 includes a secured memory 250, which may be accessible only to the security engine 230. In some embodiments, one or more of the cryptographic key components 260 may be stored in the secured memory 250. For example, in some embodiments, the hardcoded cryptographic key components, p, q, n, may be provisioned into the secured memory 250. In such embodiments, the portion storing the hardcoded cryptographic key components may be embodied as a one-time-store memory (e.g., memory fuses) such that, once stored, the hardcoded cryptographic key components, p, q, n, cannot be erased or changed. However, in other embodiments the hardcoded cryptographic key components, p, q, n, may form a portion of the firmware of the compute device 104 (e.g., of the security engine 230). The security engine 230 may also store the public exponents, e, provisioned by the cryptographic key server 102 in the secured memory 250. Further, as discussed below, the compute device 104 may utilize RSA key pairs formed from the cryptographic key components 260 to provision one or more secrets from a secret provisioner server 502 (see FIG. 5). In such embodiments, the security engine 230 may store the provisioned secret 270 in the secured memory 250 as well.

The output devices 232 may be embodied as any type of output devices capable of providing output data to a user of the compute device 104. For example, the output devices may include a display 280 and/or an audio output 282. The display may be embodied as any type of display capable of display data (e.g., visual media data) to the user. Similarly, the audio output 282 may be embodied as any type of audio output device (e.g., speakers) capable providing audio output to the user. Of course, the output devices 232 may include additional or other output devices depending on, for example, the type of compute device 104.

The input devices 234 may be embodied as any type of input devices capable of receiving an input from the user of the compute device 104. For example, the input devices may include, without limitation, a touchscreen, a keyboard, a mouse, and/or other input devices.

The data storage 236 may be embodied as any type of device or devices configured for short-term or long-term storage of data such as, for example, memory devices and circuits, memory cards, hard disk drives, solid-state drives, or other data storage devices. In operation, for example, the compute device 104 may store encrypted data (e.g., encrypted media) in the data storage 236 prior to decryption by the security engine 230 and presentation on the output devices 232.

The communication subsystem 238 may be embodied as any type of communication circuit, device, or collection thereof, capable of enabling communications between the compute device 104 and other components of the system 100. To do so, the communication subsystem 238 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

In some embodiments, the compute device 104 may also include one or more peripheral devices 240. The peripheral devices 240 may include any number of additional peripheral or interface devices, such as other input/output devices, storage devices, and so forth. The particular devices included in the peripheral devices 240 may depend on, for example, the type and/or configuration of the compute device 104.

Referring back to FIG. 1, the cryptographic key server 102 may communicate with the compute devices 104 over a local network 108. In some embodiments, the local network 108 is a protected network of the manufacturing or provisioning location at which the compute devices 104 are provisioned with the public exponent, e. The local network 108 may be embodied as any type of network capable of facilitating communications between the cryptographic key server 102 and the compute devices 104. For example, the network 108 may be embodied as, or otherwise include, a wired or wireless local area network (LAN), a wired or wireless wide area network (WAN), a cellular network, and/or a publicly-accessible, global network such as the Internet. As such, in some embodiments, the network 108 may include additional devices, such as additional computers, routers, and switches, to facilitate communications thereacross.

As discussed in more detail below, the cryptographic key server 102 is configured to generate a certificate including, the modulus, n, and the public exponent, e, for each compute device. In such embodiments, the cryptographic key server 102 may communicate with the certificate authority server 106 over the network 112 to authenticate or sign the certificate. The certificate authority server 106 is maintained by a trusted, third-party authentication company and may be embodied as any type of server compute device. As such, the certificate authority server 106 may include components similar to the cryptographic key server 102 and are not described separately herein with the understanding that the description of those components of the cryptographic key server 102 apply equally to the corresponding components of the certificate authority server 106.

The network 112 may be may be embodied as any type of network capable of facilitating communications between the cryptographic key server 102 and the certificate authority server 106. For example, the network 112 may be embodied as, or otherwise include, a wired or wireless local area network (LAN), a wired or wireless wide area network (WAN), a cellular network, and/or a publicly-accessible, global network such as the Internet. As such, in some embodiments, the network 112 may include additional devices, such as additional computers, routers, and switches, to facilitate communications thereacross.

Figure 3:
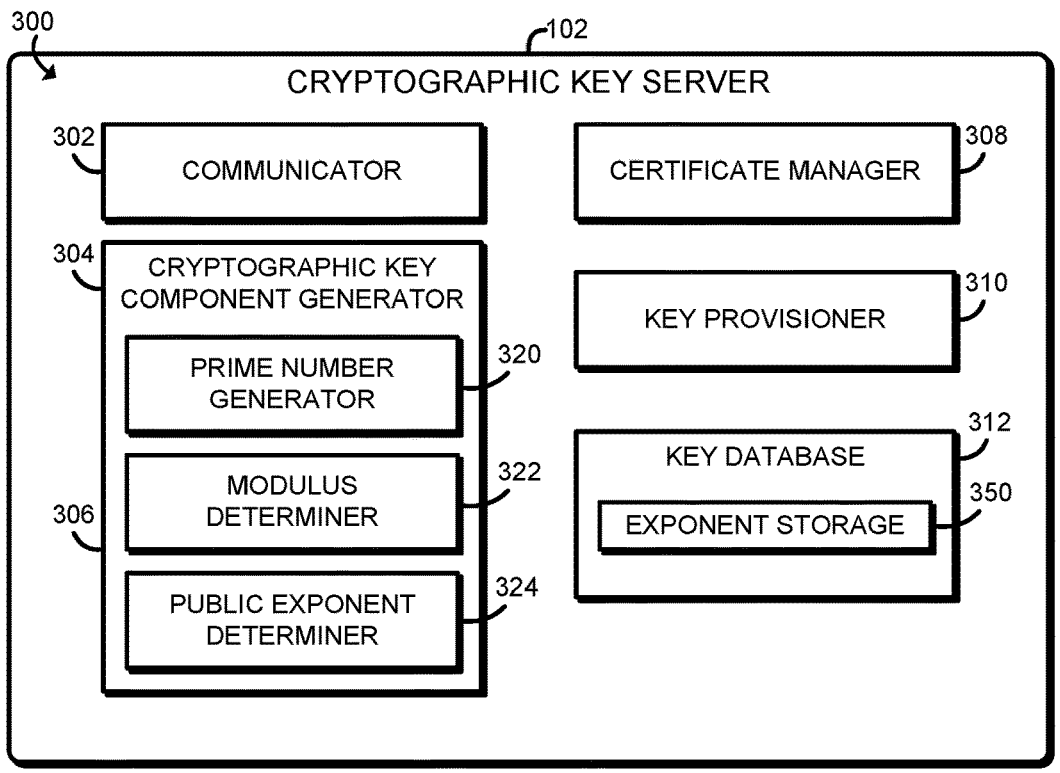
FIG. 3 is a simplified block of at least one embodiment of an environment that may be established by a cryptographic key server of the system of FIG. 1.

Referring now to FIG. 3, in use, the cryptographic key server 102 may establish an environment 300 during operation. The illustrative environment 300 includes a communicator 302, a cryptographic key component generator 304, a certificate manager 308, and a key provisioner 310. Each of the components of the environment 600 may be embodied as hardware, firmware, software, or a combination thereof. As such, in some embodiments, one or more of the components of the environment 600 may be embodied as circuitry or a collection of electrical devices (e.g., communicator circuitry 302, a cryptographic key component generator circuitry 304, a certificate manager circuitry 308, and a key provisioner circuitry 310). It should be appreciated that, in such embodiments, one or more of the communicator circuitry 302, the cryptographic key component generator circuitry 304, the certificate manager circuitry 308, and/or the key provisioner circuitry 310 may form a portion of one or more of the compute engine 120, the I/O subsystem 126, and/or other components of the cryptographic key server 102.

The communicator 302 is configured to manage communications between the cryptographic key server 102 and the compute devices 104 over the network 108. For example, as discussed in more detail below, the communicator 302 may communicate a unique, public exponent, e, to each of the compute devices 104 during a public exponent provisioning phase. Additionally, the communicator 302 may communicate with the certificate authority server 106 to generate a signed certificate that includes provisioned cryptographic key components over the network 112 as discussed in more detail below.

The cryptographic key component generator 304 is configured to generate the various cryptographic key components of the RSA cryptographic key pair to provision each of the compute device 104. To do so, the cryptographic key component generator 304 includes a prime number generator 320, a modulus determiner 322, and a public exponent determiner 324. The prime number generator 320 is configured to generate, select, or otherwise determine the two different prime numbers, p and q, of the cryptographic key components of the RSA cryptographic key pair. The generated prime numbers may be embodied as any two different prime numbers but, in the illustrative embodiment, are selected as to not be too small or too large of values based on the computation power of the compute devices 104.

The modulus determiner 322 is configured to determine the modulus, n, of the cryptographic key components of the RSA cryptographic key pair. To do so, the modulus determiner 322 multiplies the prime numbers prime numbers, p and q, generated by the prime number generator. That is, the modulus determiner 322 determines the product of p×q.

The public exponent determiner 324 is configured to determine a unique public exponent, e, of the cryptographic key components of the RSA cryptographic key pair for each compute device 104. Based on the RSA cryptographic algorithm, the public exponent, e, must be odd. Additionally, based on security practice, the public exponent, e, should be equal to or greater than 65537 for increased security. As such, in the illustrative embodiment the public exponent determiner 324 is configured to select an initial public exponent, e, that is odd and equal to or greater than 65537. Once selected, the public exponent determiner 324 determines whether the presently selected public exponent, e, is a valid for the prime numbers, p and q, generated by the prime number generator 320 and provisioned in the compute devices 104. To do so, the public exponent determiner 324 determines whether the following Equation 1 can be solved:

$$d \equiv e^1 (\text{mod } \varphi(n)) \quad \text{Equation 1}$$

wherein $\varphi(n)=(p-1)(q-1)$, e is the cryptographic exponent, and d is a private exponent. If the public exponent determiner 324 can solve Equation 1, the presently selected public exponent, e, is a valid public exponent for the corresponding prime number pair, p and q. If so, the public exponent determiner 324 stores the validated public exponent, e, in an exponent storage 350 of a key database 312. In some embodiments, the public exponent determiner 324 may store the validated public exponent, e, in association with the prime numbers, p and q, determine by the prime number generator 320. Alternatively, the public exponent determiner 324 may store the validated public exponent, e, with some other identifier that identifies the particular compute devices 104 that are to be provisioned with the validated public exponents, e.

After the public exponent determiner 324 has stored the validated public exponents, e, or if the public exponent determiner 324 determines that Equation 1 cannot be solved using the presently selected public exponent, the public exponent determiner 324 selects a subsequent or next public exponent. To do so, in the illustrative embodiment, the public exponent determiner 324 simply increases the value of the presently selected public exponent, e, by two (i.e., to the next highest odd numbers) and again checks to see if the newly selected public exponent can be validated by attempting solve Equation 1. The public exponent determiner 324 may continue to select and validate public exponents, e, until the number of validated public exponents, e, matches or exceeds the number of compute devices 104 to be provisioned.

As discussed above, in some embodiments, the cryptographic key server 102 may provision the public exponent, e, by generating a certificate that is signed by the certificate authority server 106. In such embodiments, the certificate manager 308 is configured to manage the generation of a certificate, which illustratively includes the modulus, n, and the public exponent, e, of the corresponding compute device 104 to be provisioned. The certificate manager 308 may transmit the generated certificate to the certificate authority server 106 for authentication and subsequently store the authenticated certificate in the key database 312 (e.g., the exponent storage 350).

The key provisioner 310 is configured to provision the various cryptographic key components to the compute devices 104. For example, as discussed above, the prime numbers, p and q, and the modulus, n, are hardcoded into the compute devices 104. To do so, in some embodiments, those cryptographic key components may be manually hardcoded (e.g., via incorporation into the firmware of the compute devices 104). However, in other embodiments, the key provisioner 310 may hardcode the prime numbers, p and q, generated by the prime number generator 320 and the modulus, n, generated by the modulus determiner 322 into the compute devices 104. For example, the key provisioner 310 may write those cryptographic key components to a firmware of the compute devices 104 (e.g., prior to compiling of the firmware) or otherwise store those cryptographic key components in a one-time-store memory of the compute devices 104. In either case, in the illustrative embodiment, hardcoded those cryptographic key components cannot be altered or changed after they have been written to the compute devices 104.

Figure 4:
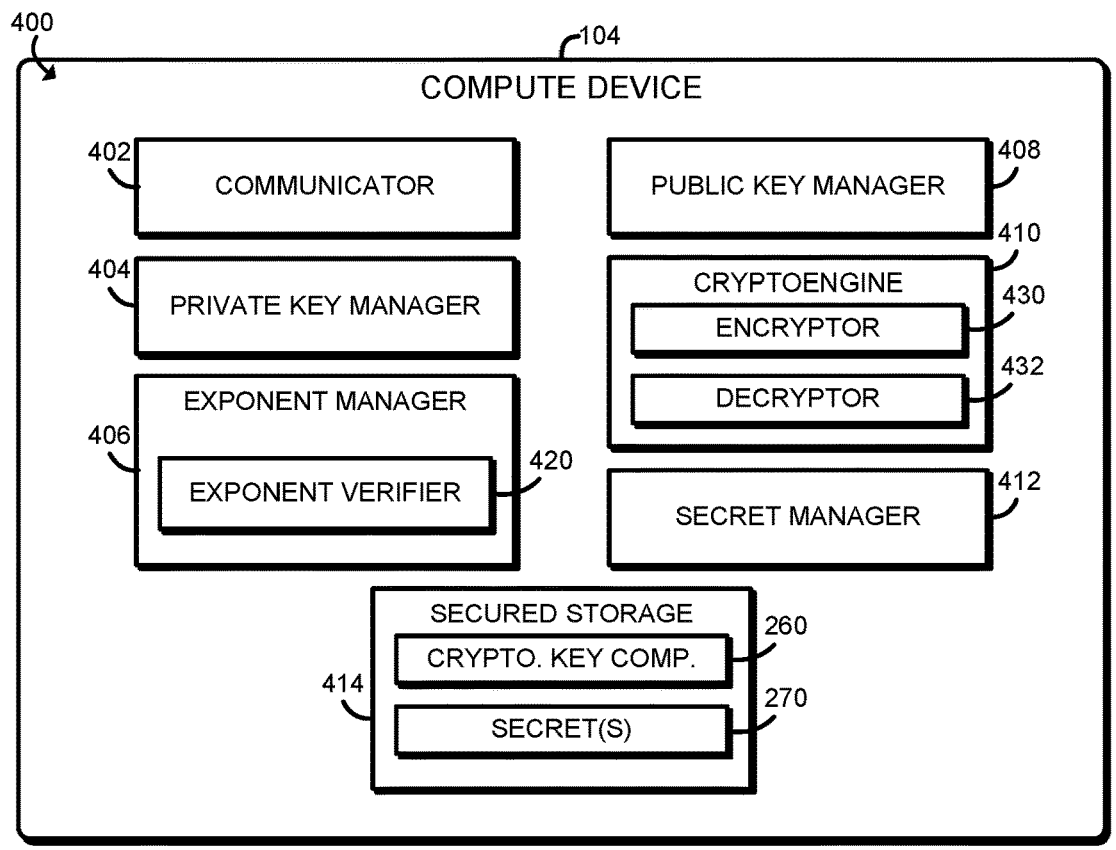
FIG. 4 is a simplified block diagram of at least one embodiment of an environment that may be established by the compute device of FIGS. 1 and 2.

Referring now to FIG. 4, in use, each compute device 104 may establish an environment 400 during operation. The illustrative environment 400 includes a communicator 402, a private key manager 404, an exponent manager 406, a public key manager 408, a cryptoengine 410, and a secret manager 412. Each of the components of the environment 400 may be embodied as hardware, firmware, software, or a combination thereof. As such, in some embodiments, one or more of the components of the environment 400 may be embodied as circuitry or a collection of electrical devices (e.g., communicator circuitry 402, private key manager circuitry 404, exponent manager circuitry 406, public key manager circuitry 408, cryptoengine 410, and secret manager circuitry 412). It should be appreciated that, in such embodiments, one or more of the communicator circuitry 402, the private key manager circuitry 404, the exponent manager circuitry 406, the public key manager circuitry 408, the cryptoengine 410, and/or the secret manager circuitry 412 may form a portion of one or more of the compute engine 220, the I/O subsystem 226, and/or other components of the compute device 104.

The communicator 402 is configured to manage communications between the compute device 104 and the cryptographic key server 102 and other components of the system 100 over the network 108. For example, as discussed above, the communicator 402 may communicate may receive cryptographic key components from the cryptographic key server 102 to be provisioned on the compute device 104.

In some embodiments, the environment includes the private key manager 404. In such embodiments, the private key manager 404 is configured to manage the generation of an RSA private key based on the modulus n and private exponent d, which may be used by the cryptoengine 410 to encrypt/decrypt various data during operation of the compute device 104. Additionally, as discussed below, the private key manager 404 may respond to requests for the private cryptographic key components, p, q, n, by the cryptographic key server 102 in some embodiments. It should be appreciated that the private cryptographic key components, p, q, n, are typically kept private by the compute device 104. However, in some embodiments, the cryptographic key server 102 may request the private cryptographic key components, p, q, n, to determine which set of validated public exponents are to be assigned to that particular compute device 104. In such embodiments, the transmission of the private cryptographic key components, p, q, n, occurs only over the protected local network 108.

The exponent manager 406 is configured to manager the provisioning of the unique, public exponent, e. To do so, the exponent manager 406 is configured to receive the unique, public exponent, e, from the cryptographic key server 102 and store the public exponent, e, in the secured storage 414 as part of the cryptographic key components 260. The secured storage 414 may be embodied as, or otherwise included in, the secured memory 250 in some embodiments.

The exponent manager 406 also includes an exponent verifier 420 configured to validate the received public exponent, e, prior to storing the public exponent in the secured storage 414. To do so, the exponent verifier 420 determines whether Equation 1 above can be solved for the received public exponent, e, and the previously provisioned prime number pair, p and q, and modulus, n. If the Equation 1 cannot be solved for the received public exponent, e, the exponent verifier 420 may discard the received public exponent and notify the cryptographic key server 102 as discussed below.

The public key manager 408 is configured manage the generation of an RSA public key based on the modulus n and public exponent e, which may be used by other compute devices to encrypt/decrypt data sent to or received from the compute device 104. The public key manager 408 also responds to requests for the compute device's 104 public key from other compute devices.

The cryptoengine 410 is configured to perform various cryptographic functions using the RSA private key (modulus n and private exponent d) of the compute device 104. To do so, the cryptoengine 410 includes an encryptor 430 to encrypt data using the provisioned RSA private key and a decryptor 432 to decrypt data encrypted with the RSA public key of the compute devices 104. As discussed in more detail below, the cryptoengine 410 may also utilize provisioned secrets to encrypt/decrypt data.

The secret manager 412 is configured to manage the provisioning of additional secrets to the compute device 104 using the provisioned RSA cryptographic key pair of the compute devices 104. For example, the secret manager 412 may receive one or more encrypted secrete keys from a secret provisioner server 502 (see FIG. 5), which are encrypted using the RSA public key of the compute device 104, decrypt the encrypted secret using the RSA private key of the compute device 104, and store the provisioned secrets in the secured storage as stored secrets 270.

Figure 5:
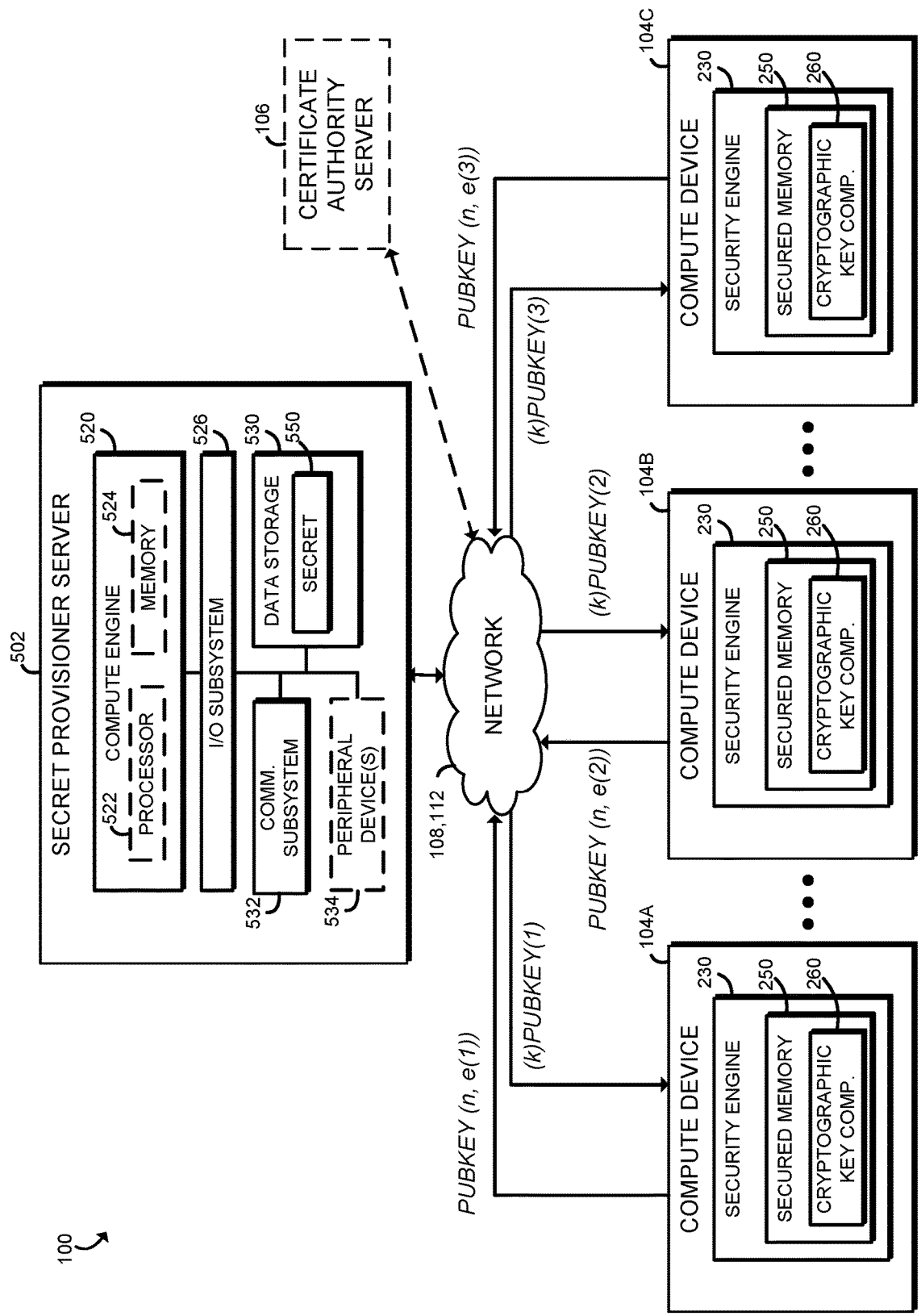
FIG. 5 is a simplified block diagram of the system of FIG. 1 including a secret provisioner server.

Referring now to FIG. 5, after each compute device 104 has been provisioned with its unique public cryptographic exponent, e, the compute devices 104 may be further provisioned with one or more secrets. The secrets may be used as a session key to communicate with other devices and encrypt/decrypt data, such as media data. To facilitate provisioning of such secrets, the system 100 may further include a secret provisioner server 502 in some embodiments as shown in FIG. 5. The secret provisioner server 502 may be embodied as a server separate from the cryptographic key server 102 in some embodiments. For example, the secret provisioner server 502 may be maintained and operated by a third party (e.g., a media distribution company), which the cryptographic key server 102 may be maintained and operated by a manufacturer of the compute device 104. Alternatively, in other embodiments, the secret provisioner server 502 may be embodied in, or form a portion of, the cryptographic key server 102. In such embodiments, the cryptographic key server 102 is configured to provision the RSA cryptographic key components, as well as subsequent secrets as discussed below.

In use, the secret provisioner server 502 may provision a different secret to each of the compute devices 104 of the group 110. To do so, the secret provisioner server 502 requests the public key from each compute device 104 to be provisioned with a unique secret. Each compute device 104 provides its RSA public key, PUBKEY (n, e). However, because each compute device 104 has been provisioned with a different public exponent, e, the RSA public key, PUBKEY (n, e), of each compute device 104 is different. As such, when the secret provisioner server 502 encrypts the unique secret with the RSA public key, PUBKEY (n, e) of a particular compute device 104, the secret provisioner server 502 returns an encrypted secret, (k)PUBKEY, that can only be decrypted by the intended compute device 104. For example, in the illustrative embodiment of FIG. 5, the compute device 104A transmits its RSA public key, PUBKEY (n, e(1)) and receives an encrypted secret, (k)PUBKEY(1), which has been encrypted with its RSA public key, PUBKEY (n, e(1)). Similarly, the compute device 104B transmits its RSA public key, PUBKEY (n, e(2)) and receives an encrypted secret, (k)PUBKEY(2), which has been encrypted with its RSA public key, PUBKEY (n, e(2)). Additionally, the compute device 104C transmits its RSA public key, PUBKEY (n, e(3)) and receives an encrypted secret, (k)PUBKEY(3), which has been encrypted with its RSA public key, PUBKEY (n, e(3)).

Similar to the cryptographic key server 102, the secret provisioner server 502 may be embodied as any type of server or other compute device capable of provisioning one or more secrets to the compute devices 104. For example, the secret provisioner server 502 may be embodied as, without limitation, one or more server computers, distributed computing systems, workstations, computers, desktop computers, laptop computers, notebook computers, tablet computers, mobile computing devices, network appliances, web appliances, processor-based systems, consumer electronic devices, and/or other compute devices. As discussed above, the secret provisioner server 502 may be independent of the cryptographic key server 102. Alternatively, the secret provisioner server 502 may be embodied as, or included in, the cryptographic key server 102 as discussed above. In embodiments in which the cryptographic key server 102 is an independent compute device, the secret provisioner server 502 may include components similar to the cryptographic key server 102. For example, the illustrative secret provisioner server 502 of FIG. 5 includes compute engine 520, an input/output ("I/O") subsystem 526, a data storage 530, a communication subsystem 532, and peripheral devices 534. Those components may be similar to the corresponding components of the cryptographic key server 102, the description of which is applicable to the components of the secret provisioner server 502 and is not repeated herein for clarity of the description.

Figure 6:
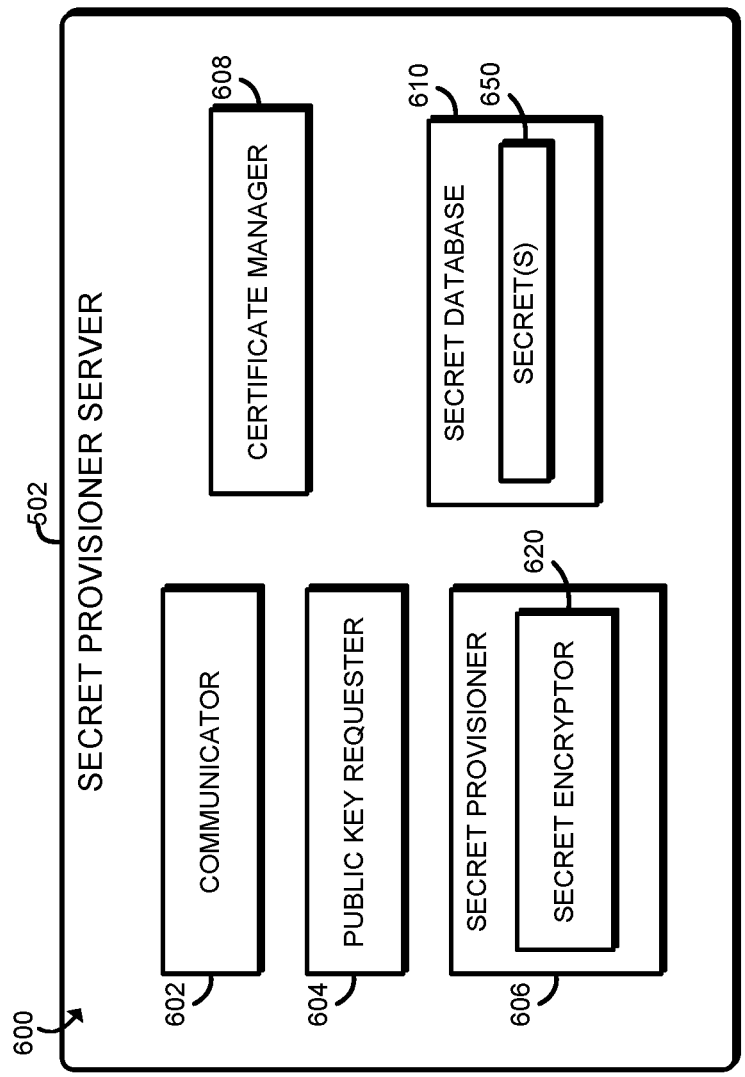
FIG. 6 is a simplified block of at least one embodiment of an environment that may be established by secret provisioner server of the system of FIG. 5.

Referring now to FIG. 6, in use, the secret provisioner server 502 may establish an environment 600 during operation. The illustrative environment 600 includes a communicator 602, a public key requester 604, a secret provisioner 606, and a certificate manager 608. Each of the components of the environment 600 may be embodied as hardware, firmware, software, or a combination thereof. As such, in some embodiments, one or more of the components of the environment 600 may be embodied as circuitry or a collection of electrical devices (e.g., a communicator circuitry 602, a public key requester circuitry 604, a secret provisioner circuitry 606, and a certificate manager circuitry 608). It should be appreciated that, in such embodiments, one or more of the communicator circuitry 602, the public key requester circuitry 604, the secret provisioner circuitry 606, and/or the certificate manager circuitry 608 may form a portion of one or more of the compute engine 520, the I/O subsystem 526, and/or other components of the secret provisioner server 502.

The communicator 602 is configured to manage communications between the secret provisioner server 502 and compute devices 104 and other components of the system 100 over the network 108, 112. For example, as discussed above, the communicator 602 may communicate with the compute devices 104 to provision an encrypted secret 550 as discussed below.

The public key requester 604 is configured to request an RSA cryptographic public key from each compute device 104 to be provisioned with a correspondence secret. The secrets of the secret provisioner server 502 are managed by the secret provisioner 606. The secret provisioner 606 retrieves a secret 650 from the secret database 610 to be provisioned to a particular compute device 104, and a secret encryptor 620 of the secret provisioner 606 encrypts the retrieved secret using the RSA public key of the recipient compute device 104. The secrete provisioner 606 subsequently transmits the encrypted secret to the corresponding compute device 104 using the communicator 602.

As discussed above, in some embodiments, the unique public exponent, e, may be provisioned to each compute device 104 as a signed certificate. In such embodiments, the compute device 104 may transmit the signed certificate to the secret provisioner server 502 in response to a public key request received from the public key requester 604. In turn, the certificate manager 608 of the secret provisioner server 502 may validate the certificate via the certificate authority server 106.

Figure 7:
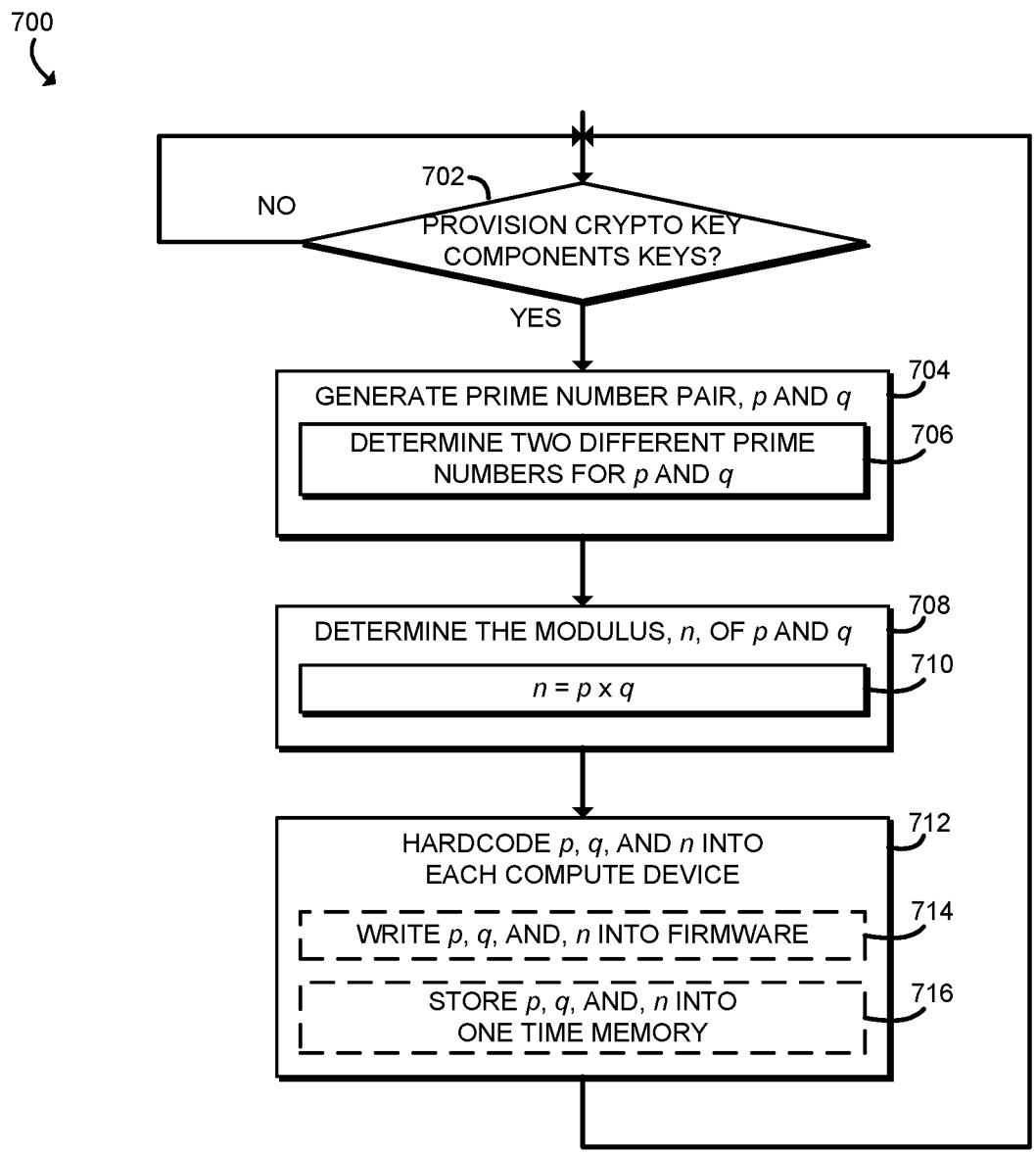
FIG. 7 is a simplified flow diagram of at least one embodiment of a method for generating and provisioning shared RSA key pair cryptographic components to the group of compute devices of the system of FIG. 1 that may be executed by the cryptographic key server of the system of FIG. 1

Referring now to FIG. 7, in use, the cryptographic key server 102 may execute a method 700 for provisioning RSA key pair cryptographic key components shared between the compute devices 104 of the group 110. The method 700 begins with block 702 in which the cryptographic key server 102 determines whether to provision the shared or common cryptographic key components. If so, the method 700 advances to block 704 in which the cryptographic key server 102 generates the two prime numbers, p and q, of the RSA cryptographic key components. Additionally, in block 706, the cryptographic key server 102 ensures the two prime numbers are different numbers. The cryptographic key server 102 may utilize any suitable methodology to generate, determine, or otherwise select the prime numbers. Subsequently, in block 708, the cryptographic key server 102 determines the modulus, n, based on the prime numbers, p and q, determined in block 704. To do so, in block 710, the cryptographic key server 102 determines the product of n=p×q.

After the cryptographic key server 102 has determined the common cryptographic key components, p, q, and n, in block 704 and 708, the determined cryptographic key components are hardcoded into each compute device 104 such that each compute device 104 has a copy of the same cryptographic key components, p, q, and n. The cryptographic key components may be hardcoded into each compute device 104 using any suitable methodology such that the cryptographic key components, p, q, and n, are unchangeable or unmodifiable once hardcoded. For example, in some embodiments, the cryptographic key components, p, q, and n, are hardcoded into the compute devices 104 by hand, such as by being physically entered into the firmware of the compute devices 104. Alternatively, in block 714, the cryptographic key server 102 may write the cryptographic key components to the firmware of the compute devices 104 (e.g., before compilation of the firmware). Alternatively or additionally, in block 716, the cryptographic key server 102 may write the cryptographic key components to a one-time-store memory device of the compute devices 104, such as a memory fuse or the like.

Figure 8:
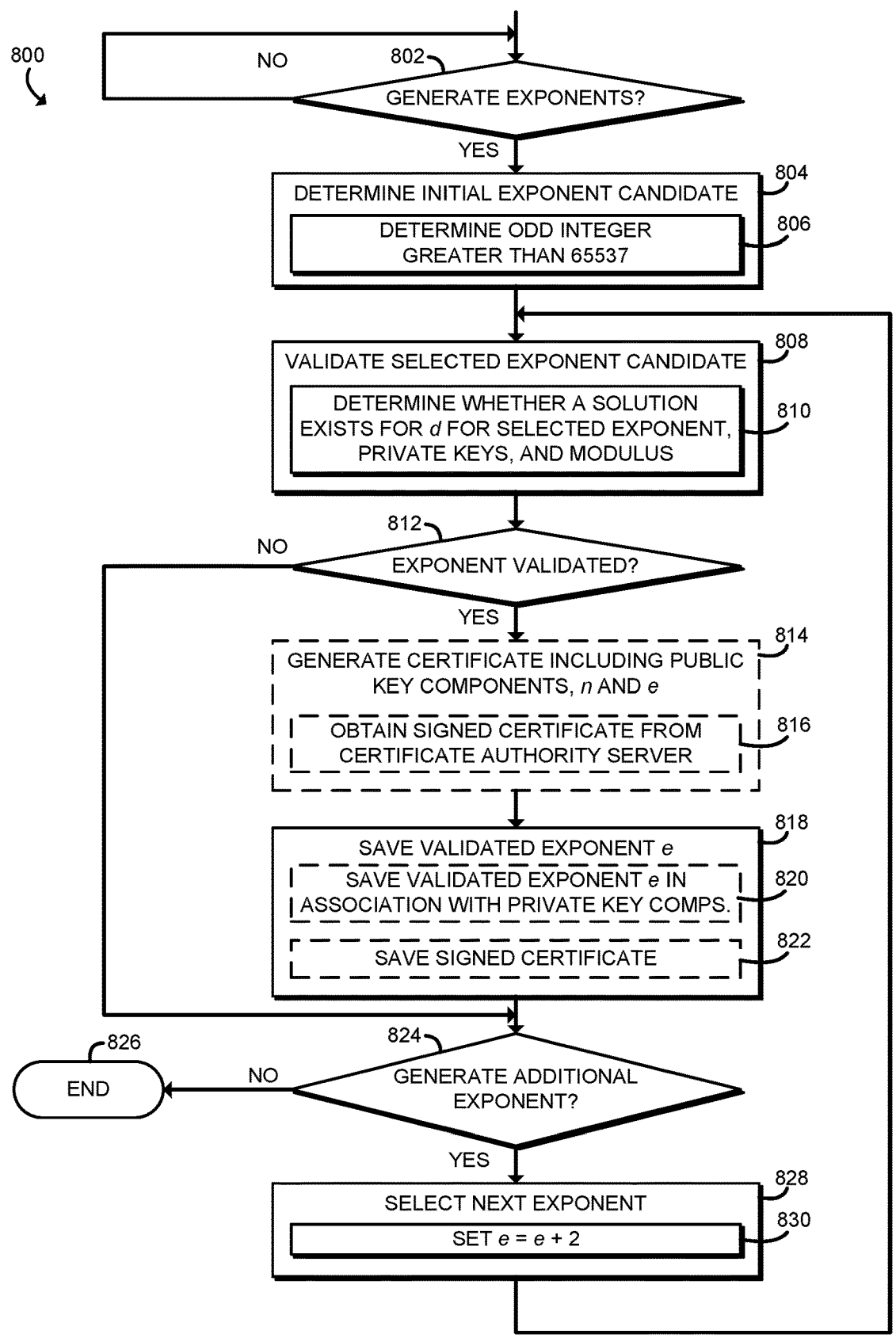
FIG. 8 is a simplified flow diagram of at least one embodiment of a method for generating unique public exponents of the RSA key pair cryptographic components that may be executed by the cryptographic key server of the system of FIGS. 1 and 3.

Referring now to FIG. 8, in use, the cryptographic key server 102 may execute a method 800 for generating unique public exponents of the RSA key pair cryptographic key components for provisioning to the compute devices 104. The method 800 begins with block 802 in which the cryptographic key server 102 determines whether to generate the public exponents. If so, the method 800 advances to block 804 in which the cryptographic key server 102 determines an initial public exponent candidate. To do so, in block 806 the cryptographic key server 102 determines, selects, or otherwise generates an odd integer is equal to or greater than 65537. As discussed above, by selecting an integer equal to or greater than 65537, the security of the system 100 is increased.

In block 808, the cryptographic key server 102 validates that the selected public exponent candidate is a valid exponent for the cryptographic key components hardcoded onto each of the compute devices 104 (i.e., the prime numbers, p and q). To do so, in block 810, the cryptographic key server 102 determines whether Equation 1, provided above, can be solved for the private exponent, d, using the public exponent candidate, e. If cryptographic key server 102 determines that the presently selected public exponent candidate is not valid in block 812, the method 800 advances to block 824 discussed below. If, however, presently selected public exponent candidate is determined to be valid, the method 800 advances to block 814 in some embodiments.

In block 814, the cryptographic key server 102 may generate a certificate that includes the public cryptographic key components, n and e. Additionally, in some embodiments, the cryptographic key server 102 may have the certificate signed by the certificate authority server 106 in block 816.

Subsequently, in block 818, the cryptographic key server 102 saves the validated, presently selected public exponent. For example, the cryptographic key server 102 may store the validated public exponent in the exponent storage 350 along with any other validated public exponents for the particular private cryptographic key components hardcoded on the compute devices 104 (i.e., prime numbers, p and q and modulus n). In some embodiments, the cryptographic key server 102 may store the validated public exponent in association with those particular private cryptographic key components in block 820. That is, the private cryptographic key components may be used as an identifier for each set of validated public exponents stored in the exponent storage 350. In embodiments in which the cryptographic key server 102 obtained a certificate in block 814, the cryptographic key server 102 may save the signed certificate in block 822.

In block 824, the cryptographic key server 102 determines whether to generate an additional exponent for the present set of private cryptographic key components hardcoded on the compute devices 104. If not, the method 800 ends in block 826. If so, the method 800 advances to block 828 in which the cryptographic key server 102 selects the next public exponent candidate. To do so, in block 830, the cryptographic key server 102 may simply increase the presently selected public exponent by two (i.e., select the next odd integer). The cryptographic key server 102 then validates the newly selected public exponent in block 808 as discussed above.

Figure 9:
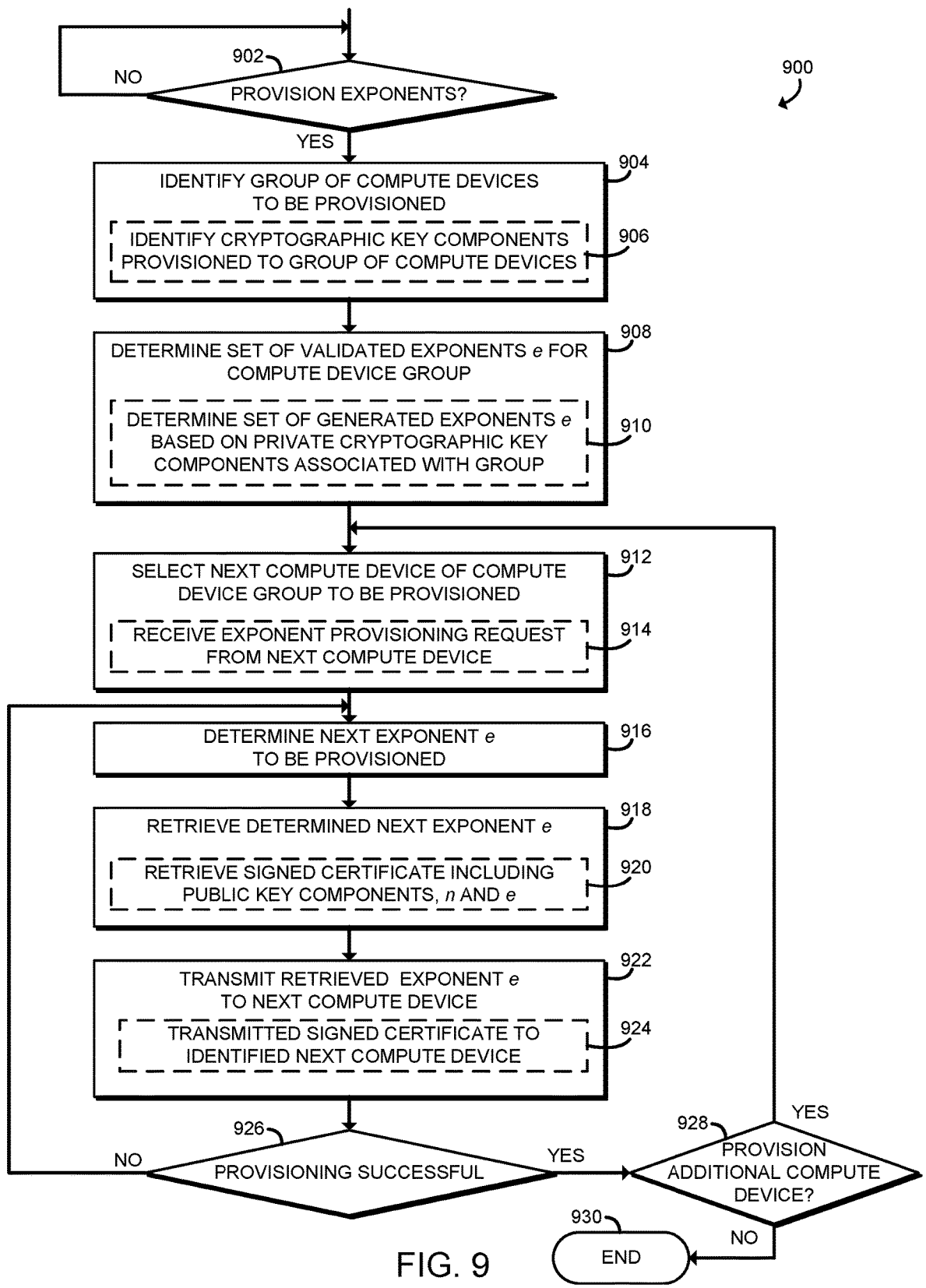
FIG. 9 is a simplified flow diagram of at least one embodiment of a method for provisioning generated public exponents to compute devices that may be executed by the cryptographic key server of the system of FIGS. 1 and 3.

Referring now to FIG. 9, the cryptographic key server 102 may also execute a method 900 for provisioning the validated public exponents to the compute devices 104. The method 900 begins with block 902 in which the cryptographic key server 102 determines whether to begin the provisioning phase. If so, the method 900 advances to block 904 in which the cryptographic key server 102 identifies the group 110 of compute devices 104 to be provisioned with the validated public exponents. As discussed above, each compute device 104 includes the same cryptographic key components, the prime numbers, p and q and the modulus n, hardcoded into it. As such, in some embodiments in block 906, the cryptographic key server 102 may identify the group of compute devices 104 to be provisioned with a set of validated public exponents based on the cryptographic key components hardcoded into each compute device 104 of the identified group. As discussed above, the validated public exponents correspond to the particular cryptographic key components hardcoded into each compute device 104.

In block 908, the cryptographic key server 102 determines which set of public exponents, e, are to be provisioned onto the identified group of compute devices 104. To do so, in block 910, the cryptographic key server 102 may identify the set of public exponents by confirming the private cryptographic key components, p and q, hardcoded onto each compute device 104 match the private cryptographic key components used to validate that particular set of public exponents. As discussed above in regard to method 800, the cryptographic key server 102 may store sets of validated public exponents in associated with or identified by the private cryptographic key components, p and q, used to validate that particular set of public exponents.

After the group of compute devices 104 and the set of validated public exponents have been determined, the method 900 advances to block 912. In block 912, the cryptographic key server 102 selects the next compute device 104 to be provisioned with a validated public exponent, e. The cryptographic key server 102 may utilize any suitable methodology for selecting the next compute device 104. For example, in some embodiments, the compute devices 104 of the same group (i.e., the same instance of compute device) may be selected in simple sequential order. Alternatively, in some embodiments, the cryptographic key server 102 may receive a request from compute device 104 to be provisioned in block 914. In such embodiments, the request may include the private cryptographic key components, p and q, hardcoded onto the requesting compute device 104 such that the cryptographic key server 102 may select the correct set of validated public exponents, e. However, because the private cryptographic key components are to be kept private, such communications would occur only over a trusted network or in a trusted environment.

In block 916, the cryptographic key server 102 determines or selects the next public exponent, e, to be provisioned. As discussed above, each provisioned public exponent is unique for that group of compute devices 104. As such, although each compute device 104 has a common copy of the prime numbers, p and q and modulus n, each compute device 104 will have a different public exponent, e. In block 918, the cryptographic key server 102 retrieves the selected next public exponent to be provisioned. In embodiments in which the public exponent was saved as part of a signed certificate, the cryptographic key server 102 may retrieve the signed certificate including the selected next public exponent in block 920.

In block 922, the cryptographic key server 102 transits the retrieved public exponent, e, to the compute device 104 to be provisioned. Again, in embodiments in which the public exponent was saved as part of a signed certificate, the cryptographic key server 102 may transmit the signed certificate in block 924. Regardless, after the public exponent has been sent to the compute device 104, the cryptographic key server 102 determines whether the sent public exponent has been successfully provisioned by the compute device 104 (e.g., whether the sent public exponent has been validated by the receiving compute device 104 as discussed below) in block 926. If not, the method 900 loops back to 912 in which the cryptographic key server 102 selects a different public exponent. If, however, the sent public exponent has successfully been provisioned by the receiving compute device 104, the method 900 advances to block 928 in which the cryptographic key server 102 determines whether there are any remaining compute devices 104 of the present group of compute devices 104 to be provisioned. If so, the method 900 loops back to block 912 in which the next compute device 104 is selected for provisioning. If not, the method 900 ends in block 930.

Figure 10:
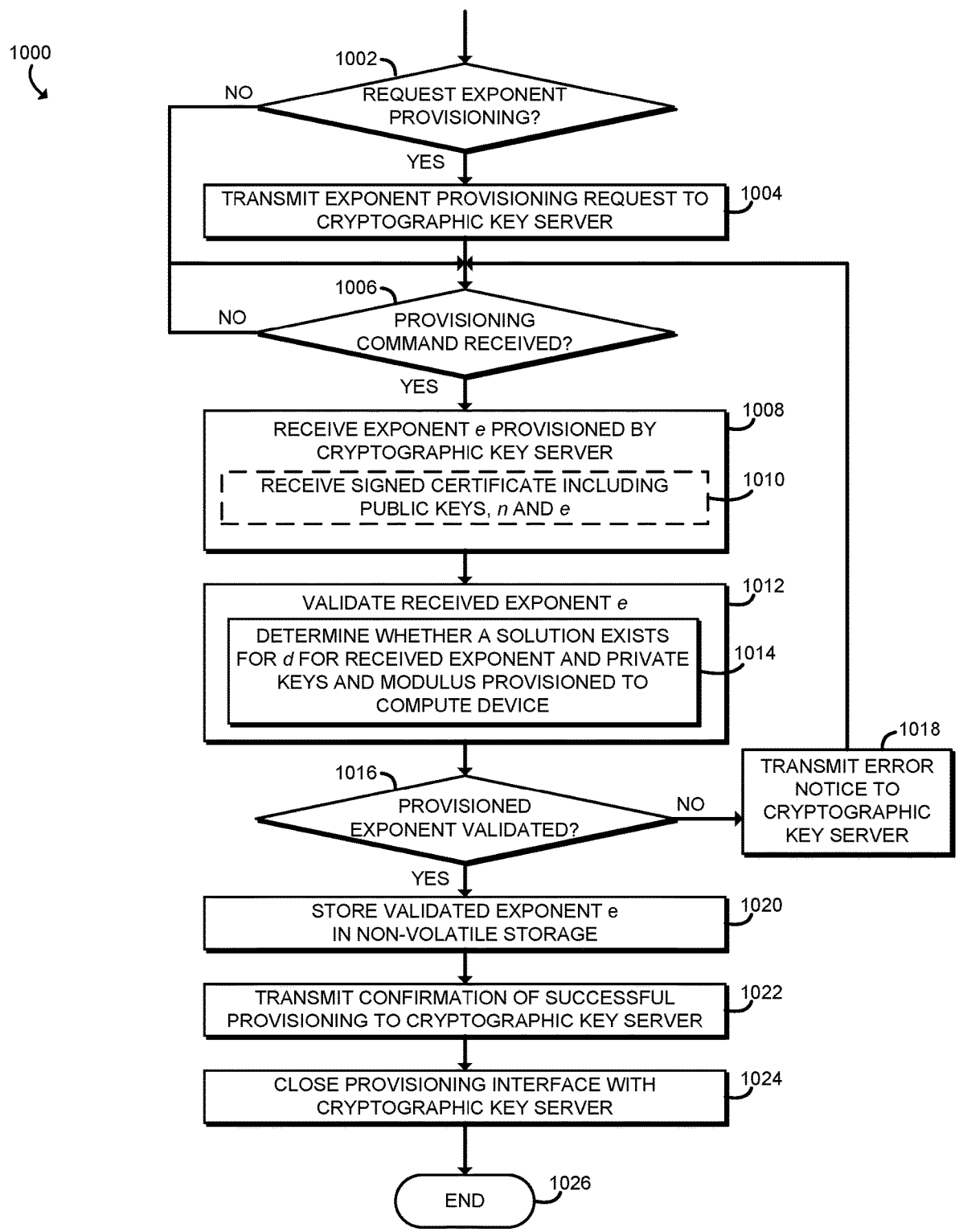
FIG. 10 is a simplified flow diagram of at least one embodiment of a method for provisioning a received public exponent of the RSA key pair cryptographic components that may be executed by the compute device of FIGS. 1, 2, and 4.

Referring now to FIG. 10, in use, each compute device 104 may execute a method 1000 for provisioning a received public exponent of the RSA key pair cryptographic key components. The method 1000 begins with block 1002 in which the compute device 104 determines whether to request the provisioning of a public exponent, e. As discussed above, in some embodiments, the compute device 104 may communicate with the cryptographic key server 102 to request provisioning. If so, the method 1000 advances to block 1004 in which the compute device 104 transmits an exponent provisioning request to the cryptographic key server 102. As discussed above, in some embodiments, the exponent provisioning request may include the private cryptographic key components, p and q, hardcoded onto the requesting compute device 104.

Regardless of whether the compute device 104 requested the provisioning of the public exponent or if the cryptographic key server 102 initiates such provisioning, the compute device 104 determines whether a provisioning command has been received in block 1006. If so, in block 1008, the compute device 104 receives the public exponent, e, provisioned by the cryptographic key server 102. In embodiments in which the public exponent was saved as part of a signed certificate, the compute device 104 may receive the signed certificate in block 1010.

In block 1012, the compute device 104 validates the received public exponent. To do so, in block 1014, the compute device 104 determines whether Equation 1, provided above, can be solved for the private exponent, d, using the public exponent candidate, e, received from the cryptographic key server 102. If compute device 104 determines that the received public exponent is not valid in block 1016, the method 1000 advances to block 1018 in which the compute device 104 transmits a notification to the cryptographic key server 102 notifying that the received public exponent could not be validated. The method 1000 subsequently loops back to block 1006 to await a new provisioning command from the cryptographic key server 102.

If, however, the compute device 104 determines that the received public exponent is valid, the method 1000 advances to block 1020 in which the compute device 104 stores the validated public exponent in a non-volatile storage, such as the secured memory 250. Subsequently, in block 1022, the compute device 104 transmits a notification to the cryptographic key server 102 notifying that the received public exponent was validated. In block 1024, the compute device 104 closes the provisioning interface with the cryptographic key server 102, and the method 1000 ends in block 1026.

Figure 11:
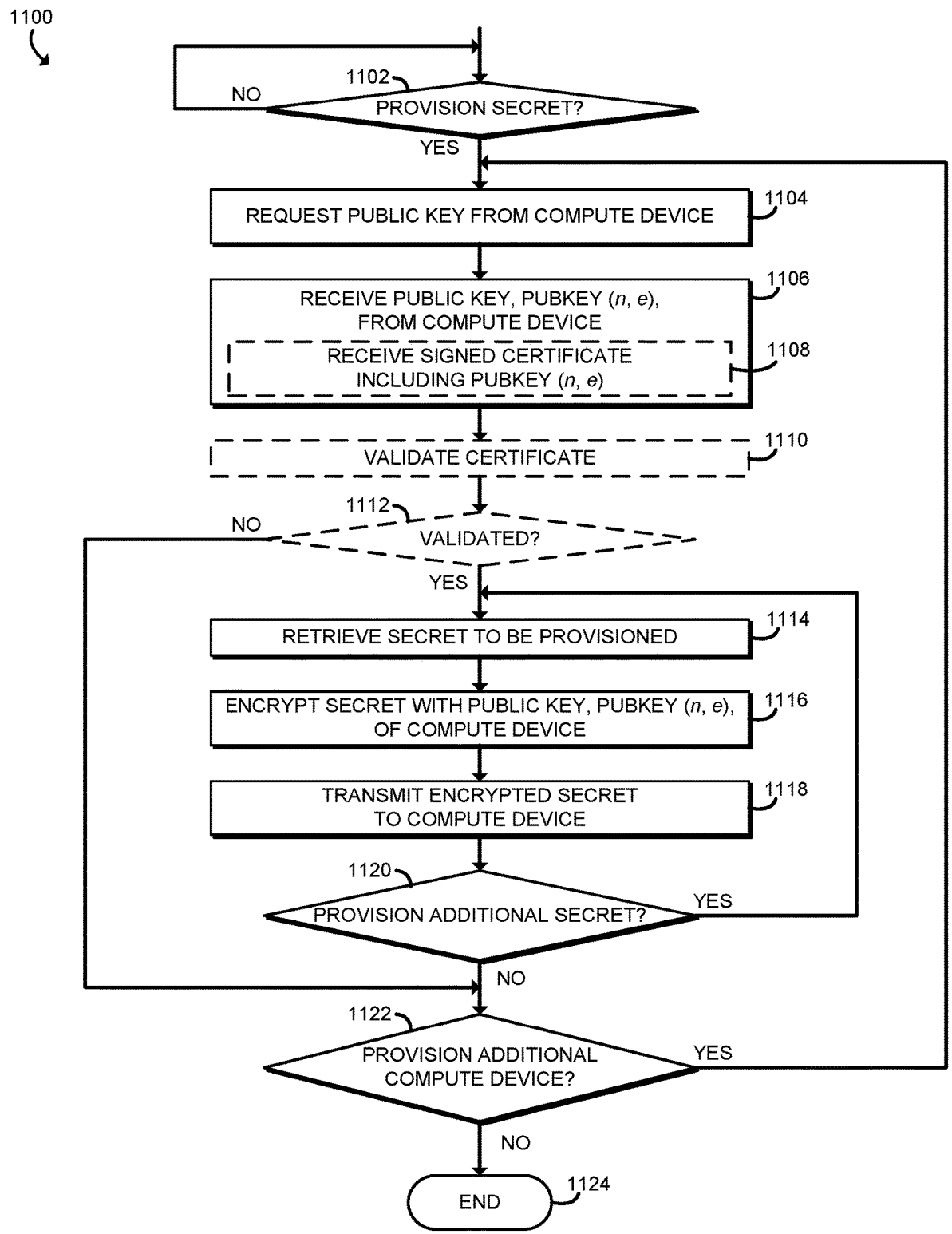
FIG. 11 is a simplified flow diagram of at least one embodiment of a method for provisioning a secret that may be executed by the secret provisioner server of FIGS. 5 and 6.

Referring now to FIG. 11, in use, the secret provisioner server 502 may execute a method 1100 for provisioning a secret to a compute device 104. The method 1100 begins with block 1102 in which the secret provisioner server 502 determines whether to provision a secret to a compute device 104. If so, the method 1100 advances to block 1104 in which the secret provisioner server 502 request the public cryptographic key, PUBKEY (n, e), from the compute device 104. In block 1106, the secret provisioner server 502 receives the requested public cryptographic key from the compute device 104. In embodiments in which the compute device 104 received the provisioned public exponent as part of a signed certificate, the secret provisioner server 502 may receive the signed certificate, including the public key, in block 1108. In such embodiments, the secret provisioner server 502 may validate the received certificate in block 1110 using the certificate authority server 106. If the certificate is not validated in block 1112, the method 1100 may advance to block 1122 in which the secret provisioner server 502 determines skips the present compute device 104 and determines whether to provision another compute device 104 with a secret.

If the secret provisioner server 502 determines that certificate received from the compute device 104 has been validated in block 1112 or if no certificate was received, the method 1100 advances to block 1114 in which secret provisioner server 502 retrieves a secret to be provisioned to the particular compute device 104. In block 1116, the secret provisioner server 502 encrypts the retrieves secret using the compute device's 104 public key received in block 1106. The secret provisioner server 502 subsequently transmits the encrypted secret to the compute device 104 in block 1118.

In block 1120, the secret provisioner server 502 determines whether to provision the same compute device 104 with another, different secret. If so, the method 1100 loops back to block 1114 in which the secret provisioner server 502 retrieves the next secret to be provisioned. If not, the method 1100 advances to block 1112 in which the secret provisioner server 502 determines whether to provision another compute device 104. If so, the method 1100 loops back to block 1104 in which the secret provisioner server 502 requests the public cryptographic key of the next compute device 104. If not, the method 1100 ends in block 1124.

Figure 12:
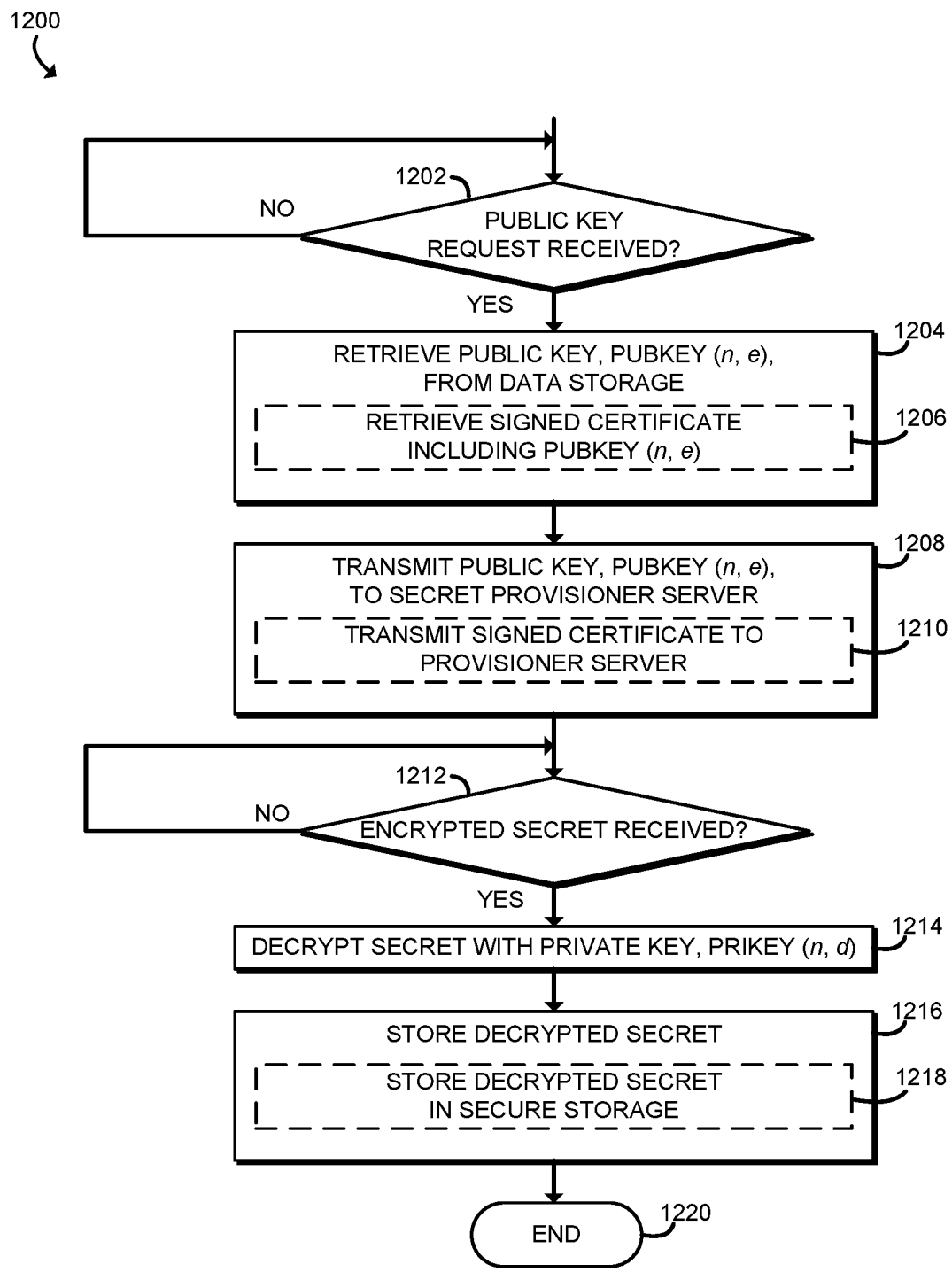
FIG. 12 is a simplified flow diagram of at least one embodiment of a method for provisioning a received secret that may be executed by the compute device of FIGS. 1, 2, and 4.

Referring now to FIG. 12, in use, the compute device 104 may execute a method 1200 for provisioning a received secret that may be executed by a compute device 104. The method 1200 begins with block 1202 in which the compute device 104 determines whether a public cryptographic key request has been received from a secret provisioner server 502. If so, the method 1200 advances to block 1204 in which the compute device 104 retrieves its public key, PUBKEY (n, e,) from the secured memory 250. In embodiments in which the compute device 104 received the provisioned public exponent as part of a signed certificate, the compute device 104 may retrieve the signed certificate in block 1206. The compute device 104 subsequently transmits the retrieved public key, PUBKEY (n, e,) to the secret provisioner server 502 in block 1208 or transmits the retrieved signed certificate in block 1210.

In block 1212, the compute device 104 determines whether an encrypted secret has been received from the secret provisioner server 502. If so, in block 1214, the compute device 104 decrypts the encrypted secret using its private key, PRIKEY (n, d). The compute device 104 stores the decrypted secret in block 1216. For example, in block 1218, the compute device 104 may store the decrypted secret in the secure storage 414. The method ends in block 1220. In this way, a unique, provisioned public exponent, e, allows each compute device 104 to receive encrypted keys that only the targeted compute device 104 can decrypted even when the compute device 104 is part of an instance group of compute devices.

EXAMPLES

Illustrative examples of the technologies disclosed herein are provided below. An embodiment of the technologies may include any one or more, and any combination of, the examples described below.

Example 1 includes a cryptographic key server for provisioning cryptographic keys to a plurality of compute devices, the cryptographic key server comprising a cryptographic component generator to determine (i) cryptographic key components of a Rivest-Shamir-Adleman (RSA) public-private key pair to be hardcoded into each compute device of the plurality of compute devices, wherein the cryptographic key components comprises a pair of different prime numbers, p and q, and a modulus, n, of the determined pair of prime numbers, p and q and (ii) a plurality of cryptographic exponents, wherein each cryptographic exponent forms a valid RSA public-private key pair with cryptographic key components hardcoded into each compute device of the plurality of compute devices; and a key provisioner to transmit, to each compute device of the compute devices of the plurality of compute devices, a different cryptographic exponent of the determined plurality of cryptographic exponents to be stored on the corresponding compute device.

Example 2 includes the subject matter of Example 1, and wherein the key provisioner is further to write the cryptographic key components into a firmware of each compute device of the plurality of compute devices.

Example 3 includes the subject matter of any of Examples 1 and 2, and wherein the key provisioner is further to store the cryptographic key components into a one-time-store memory device of each compute device of the plurality of compute devices.

Example 4 includes the subject matter of any of Examples 1-3, and wherein to determine the plurality of cryptographic exponents comprises to determine an initial cryptographic exponent, wherein the initial cryptographic exponent is an odd integer equal to or greater than 65537.

Example 5 includes the subject matter of any of Examples 1-4, and wherein to determine the plurality of cryptographic exponents comprises to determine a subsequent cryptographic exponent by increasing the initial cryptographic exponent by two.

Example 6 includes the subject matter of any of Examples 1-5, and wherein to determine the plurality of cryptographic exponents comprises to determine, by the cryptographic key server, a potential cryptographic exponent; and validate the determined cryptographic potential exponent by determining whether a solution exists for $d \equiv e^1 \pmod{\varphi(n)}$, wherein $\varphi(n) = (p-1)(q-1)$ and e is the potential cryptographic exponent.

Example 7 includes the subject matter of any of Examples 1-6, and further including a certificate manager to generate, for each cryptographic exponent of the plurality of cryptographic exponents, a signed certificate including the modulus, n, and the corresponding cryptographic exponent.

Example 8 includes the subject matter of any of Examples 1-7, and wherein to transmit a different cryptographic exponent of the determined plurality of cryptographic exponents comprises to transmit a different one of the signed certificates to a corresponding different compute device of the plurality of compute devices.

Example 9 includes the subject matter of any of Examples 1-8, and wherein to transmit a different cryptographic exponent of the determined plurality of cryptographic exponents comprises to receive, from each compute device of the plurality of compute devices, an exponent provisioning request for provisioning of a cryptographic exponent.

Example 10 includes the subject matter of any of Examples 1-9, and wherein the key provisioner is further to identify the plurality of cryptographic exponents for provisioning to the plurality of compute devices based on the cryptographic key components hardcoded in each compute device of the plurality of compute devices.

Example 11 includes the subject matter of any of Examples 1-10, and further including a communicator to receive, from at least one compute device, an indication that the provisioning of a corresponding cryptographic exponent received by the at least one compute device was unsuccessful, wherein the cryptographic component generator is further to select another cryptographic exponent from the plurality of cryptographic exponents different from the corresponding cryptographic exponent, and wherein the key provisioner is further to transmit the another cryptographic exponent to the at least one compute device.

Example 12 includes the subject matter of any of Examples 1-11, and further including a public key requester to request a public key from a first compute device of the plurality of compute devices; a communicator to receive, from the first compute device, the public key of the first compute device; and a secret provisioner to (i) encrypt a first secret unique to the first compute device using the public key of the first compute device and (ii) transmit the encrypted first secret to the first compute device.

Example 13 includes the subject matter of any of Examples 1-12, and wherein the public key requester is further to request a public key from a second compute device of the plurality of compute devices different from the first compute device, the communicator is further to receive, from the second compute device, the public key of the second compute device, and the secret provisioner is further to encrypt a second secret unique to the second compute device using the public key of the second compute device and (ii) transmit the encrypted second secret to the second compute device.

Example 14 includes a method for provisioning cryptographic keys to a plurality of compute devices, the method comprising determining, by a cryptographic key server, cryptographic key components of a Rivest-Shamir-Adleman (RSA) public-private key pair to be hardcoded into each compute device of the plurality of compute devices, wherein the cryptographic key components comprises a pair of different prime numbers, p and q, and a modulus, n, of the determined pair of prime numbers, p and q; determining, by the cryptographic key server, a plurality of cryptographic public exponents, e, wherein each cryptographic public exponent forms a valid RSA public-private key pair with the cryptographic key components hardcoded into each compute device of the plurality of compute devices; and transmitting, by the cryptographic key server and to each compute device of the compute devices of the plurality of compute devices, a different cryptographic exponent of the determined plurality of cryptographic exponents to be stored on the corresponding compute device.

Example 15 includes the subject matter of Example 14, and further including writing, by the cryptographic key server, the cryptographic key components into a firmware of each compute device of the plurality of compute devices.

Example 16 includes the subject matter of any of Examples 14 and 15, and further including storing, by the cryptographic key server, the cryptographic key components into a one-time-store memory device of each compute device of the plurality of compute devices.

Example 17 includes the subject matter of any of Examples 14-16, and wherein determining the plurality of cryptographic exponents comprises determining an initial cryptographic exponent, wherein the initial cryptographic exponent is an odd integer equal to or greater than 65537.

Example 18 includes the subject matter of any of Examples 14-17, and wherein determining the plurality of cryptographic exponents comprises determining a subsequent cryptographic exponent by increasing the initial cryptographic exponent by two.

Example 19 includes the subject matter of any of Examples 14-18, and wherein determining the plurality of cryptographic exponents comprises determining, by the cryptographic key server, a potential exponent; and validating the determined potential exponent by determining whether a solution exists for $d \equiv e^{-1} \pmod{\varphi(n)}$, wherein $\varphi(n)=(p-1)(q-1)$.

Example 20 includes the subject matter of any of Examples 14-19, and further including generating, by the cryptographic key server and for each cryptographic exponent of the plurality of cryptographic exponents, a signed certificate including the modulus, n, and the corresponding cryptographic exponent.

Example 21 includes the subject matter of any of Examples 14-20, and wherein transmitting a different cryptographic exponent of the determined plurality of cryptographic exponents comprises transmitting a different one of the signed certificates to a corresponding different compute device of the plurality of compute devices.

Example 22 includes the subject matter of any of Examples 14-21, and wherein transmitting a different cryptographic exponent of the determined plurality of cryptographic exponents comprises receiving, from each compute device of the plurality of compute devices, an exponent provisioning request for provisioning of a cryptographic exponent.

Example 23 includes the subject matter of any of Examples 14-22, and further including identifying the plurality of cryptographic exponents for provisioning to the plurality of compute devices based on the cryptographic key components hardcoded in each compute device of the plurality of compute devices.

Example 24 includes the subject matter of any of Examples 14-23, and further including receiving, by cryptographic key server and from at least one compute device, an indication that the provisioning of a corresponding cryptographic exponent received by the at least one compute device was unsuccessful; selecting, by the cryptographic key server, another cryptographic exponent from the plurality of cryptographic exponents different from the corresponding cryptographic exponent; and transmitting, by the cryptographic key server, the another cryptographic exponent to the at least one compute device.

Example 25 includes the subject matter of any of Examples 14-24, and further including requesting, by the cryptographic key server, a public key from a first compute device of the plurality of compute devices; receiving, by the cryptographic key server and from the first compute device, the public key of the first compute device; encrypting, by the cryptographic key server, a first secret unique to the first compute device using the public key of the first compute device; and transmitting, by the cryptographic key server, the encrypted first secret to the first compute device.

Example 26 includes the subject matter of any of Examples 14-25, and further including requesting, by the cryptographic key server, a public key from a second compute device of the plurality of compute devices different from the first compute device; receiving, by the cryptographic key server and from the second compute device, the public key of the second compute device; encrypting, by the cryptographic key server, a second secret unique to the second compute device using the public key of the second compute device; and transmitting, by the cryptographic key server, the encrypted second secret to the second compute device.

Example 27 includes one or more machine-readable storage media comprising a plurality of instructions stored thereon that, when executed, causes a cryptographic key server to perform the method of any of Examples 14-26.

Example 28 includes a cryptographic key server for provisioning cryptographic keys to a plurality of compute devices, the cryptographic key server comprising means for determining cryptographic key components of a Rivest-Shamir-Adleman (RSA) public-private key pair to be hardcoded into each compute device of the plurality of compute devices, wherein the cryptographic key components comprises a pair of different prime numbers, p and q, and a modulus, n, of the determined pair of prime numbers, p and q; means for determining a plurality of cryptographic public exponents, e, wherein each cryptographic public exponent forms a valid RSA public-private key pair with the cryptographic key components hardcoded into each compute device of the plurality of compute devices; and means for transmitting, to each compute device of the compute devices of the plurality of compute devices, a different cryptographic exponent of the determined plurality of cryptographic exponents to be stored on the corresponding compute device.

Example 29 includes the subject matter of Example 28, and further including writing, by the cryptographic key server, the cryptographic key components into a firmware of each compute device of the plurality of compute devices.

Example 30 includes the subject matter of any of Examples 28 and 29, and further including storing, by the cryptographic key server, the cryptographic key components into a one-time-store memory device of each compute device of the plurality of compute devices.

Example 31 includes the subject matter of any of Examples 28-30, and wherein determining the plurality of cryptographic exponents comprises determining an initial cryptographic exponent, wherein the initial cryptographic exponent is an odd integer equal to or greater than 65537.

Example 32 includes the subject matter of any of Examples 28-31, and wherein determining the plurality of cryptographic exponents comprises determining a subsequent cryptographic exponent by increasing the initial cryptographic exponent by two.

Example 33 includes the subject matter of any of Examples 28-32, and wherein determining the plurality of cryptographic exponents comprises determining, by the cryptographic key server, a potential exponent; and validating the determined potential exponent by determining whether a solution exists for $d \equiv e^1 \pmod{\varphi(n)}$, wherein $\varphi(n)=(p-1)(q-1)$.

Example 34 includes the subject matter of any of Examples 28-33, and further including generating, by the cryptographic key server and for each cryptographic exponent of the plurality of cryptographic exponents, a signed certificate including the modulus, n, and the corresponding cryptographic exponent.

Example 35 includes the subject matter of any of Examples 28-34, and wherein transmitting a different cryptographic exponent of the determined plurality of cryptographic exponents comprises transmitting a different one of the signed certificates to a corresponding different compute device of the plurality of compute devices.

Example 36 includes the subject matter of any of Examples 28-35, and wherein transmitting a different cryptographic exponent of the determined plurality of cryptographic exponents comprises receiving, from each compute device of the plurality of compute devices, an exponent provisioning request for provisioning of a cryptographic exponent.

Example 37 includes the subject matter of any of Examples 28-36, and further including identifying the plurality of cryptographic exponents for provisioning to the plurality of compute devices based on the cryptographic key components hardcoded in each compute device of the plurality of compute devices.

Example 38 includes the subject matter of any of Examples 28-37, and further including receiving, by cryptographic key server and from at least one compute device, an indication that the provisioning of a corresponding cryptographic exponent received by the at least one compute device was unsuccessful; selecting, by the cryptographic key server, another cryptographic exponent from the plurality of cryptographic exponents different from the corresponding cryptographic exponent; and transmitting, by the cryptographic key server, the another cryptographic exponent to the at least one compute device.

Example 39 includes the subject matter of any of Examples 28-38, and further including requesting, by the cryptographic key server, a public key from a first compute device of the plurality of compute devices; receiving, by the cryptographic key server and from the first compute device, the public key of the first compute device; encrypting, by the cryptographic key server, a first secret unique to the first compute device using the public key of the first compute device; and transmitting, by the cryptographic key server, the encrypted first secret to the first compute device.

Example 40 includes the subject matter of any of Examples 28-39, and further including requesting, by the cryptographic key server, a public key from a second compute device of the plurality of compute devices different from the first compute device; receiving, by the cryptographic key server and from the second compute device, the public key of the second compute device; encrypting, by the cryptographic key server, a second secret unique to the second compute device using the public key of the second compute device; and transmitting, by the cryptographic key server, the encrypted second secret to the second compute device.

Example 41 includes a compute device of a plurality of compute devices for provisioning cryptographic keys onto the compute device, the compute device comprising nonvolatile data storage having stored therein cryptographic key components of a Rivest-Shamir-Adleman (RSA) public-private key pair in a hardcoded manner, wherein the cryptographic key components comprises a pair of different prime numbers, p and q, and a modulus, n, of the determined pair of prime numbers, p and q; and an exponent manager to receive, from a cryptographic key server, a cryptographic exponent that forms a valid RSA public-private key pair with the cryptographic key components, wherein the cryptographic exponent is unique relative to a corresponding exponent of each other compute device of the plurality of compute devices.

Example 42 includes the subject matter of Example 41, and wherein to store the cryptographic key components comprises to write the cryptographic key components to a firmware of the compute device.

Example 43 includes the subject matter of any of Examples 41 and 42, and wherein to store the cryptographic key components comprises to write the cryptographic key components to a one-time-store memory device of the compute device.

Example 44 includes the subject matter of any of Examples 41-43, and wherein to receive the cryptographic exponent comprises to receive signed certificate including the modulus, n, and the cryptographic exponent.

Example 45 includes the subject matter of any of Examples 41-44, and further including a communicator to transmit an exponent provisioning request to the cryptographic server prior to receiving the cryptographic exponent.

Example 46 includes the subject matter of any of Examples 41-45, and wherein the exponent manager is further to validate the cryptographic exponent by determining whether a solution exists for $d \equiv e^1 \pmod{\varphi(n)}$, wherein $\varphi(n)=(p-1)(q-1)$ and e is the cryptographic exponent.

Example 47 includes the subject matter of any of Examples 41-46, and further including a communicator to transmit a notification to the cryptographic key server informing that the provisioning of the cryptographic exponent was unsuccessful in response a determination that the cryptographic exponent is not valid.

Example 48 includes the subject matter of any of Examples 41-47, and wherein the exponent manager is to store, in response to a determination that the cryptographic exponent is valid, the cryptographic exponent in a non-volatile memory of the compute device; and further comprising a communicator to transmit a notification to the cryptographic key server informing that the provisioning of the cryptographic exponent was successful in response to a determination that the cryptographic exponent is valid.

Example 49 includes the subject matter of any of Examples 41-48, and further including a communicator to receive, from the cryptographic key server, a request for a public key of the compute device; a public key manager to (i) retrieve the public key, wherein the public key is formed from the modulus, n, and the cryptographic exponent and (ii) transmit, the public key to the cryptographic key server, wherein the communicator is further to receive, from the cryptographic key server, an encrypted secret, wherein the encrypted secret is encrypted using the public key; and further comprising a cryptoengine to decrypt the encrypted secret using a private key, wherein the private key is formed from the modulus, n, and a private exponent, d, wherein $d \equiv e^1 \pmod{\varphi(n)}$, wherein $\varphi(n)=(p-1)(q-1)$ and e is the cryptographic exponent.

Example 50 includes a method for provisioning cryptographic keys onto a compute device of a plurality of compute devices, the method comprising storing, by the compute device, cryptographic key components of a Rivest-Shamir-Adleman (RSA) public-private key pair in a hardcoded manner, wherein the cryptographic key components comprises a pair of different prime numbers, p and q, and a modulus, n, of the determined pair of prime numbers, p and q; and receiving, by the compute device and from a cryptographic key server, a cryptographic exponent that forms a valid RSA public-private key pair with the cryptographic key components, wherein the cryptographic exponent is unique relative to a corresponding exponent of each other compute device of the plurality of compute devices.

Example 51 includes the subject matter of Example 50, and wherein storing the cryptographic key components comprises writing the cryptographic key components to a firmware of the compute device.

Example 52 includes the subject matter of any of Examples 50 and 51, and wherein storing the cryptographic key components comprises writing the cryptographic key components to a one-time-store memory device of the compute device.

Example 53 includes the subject matter of any of Examples 50-52, and wherein receiving the cryptographic exponent comprises receive signed certificate including the modulus, n, and the cryptographic exponent.

Example 54 includes the subject matter of any of Examples 50-53, and further including transmitting, by the compute device, an exponent provisioning request to the cryptographic server prior to receiving the cryptographic exponent.

Example 55 includes the subject matter of any of Examples 50-54, and further including validating, by the compute device, the cryptographic exponent by determining whether a solution exists for $d \equiv e^1 \pmod{\varphi(n)}$, wherein $\varphi(n)=(p-1)(q-1)$ and e is the cryptographic exponent.

Example 56 includes the subject matter of any of Examples 50-55, and further including transmitting, by the compute device, a notification to the cryptographic key server informing that the provisioning of the cryptographic exponent was unsuccessful in response a determination that the cryptographic exponent is not valid.

Example 57 includes the subject matter of any of Examples 50-56, and further including storing, by the compute device an in response to a determination that the cryptographic exponent is valid, the cryptographic exponent in a non-volatile memory of the compute device; and transmitting, by the compute device, a notification to the cryptographic key server informing that the provisioning of the cryptographic exponent was successful in response to a determination that the cryptographic exponent is valid.

Example 58 includes the subject matter of any of Examples 50-57, and further including receiving, by the compute device and from the cryptographic key server, a request for a public key of the compute device; retrieving, by the compute device, the public key, wherein the public key is formed from the modulus, n, and the cryptographic exponent; transmit, by the compute device, the public key to the cryptographic key server; receive, by the compute device and from the cryptographic key server, an encrypted secret, wherein the encrypted secret is encrypted using the public key; and decrypting, by the compute device, the encrypted secret using a private key, wherein the private key is formed from the modulus, n, and a private exponent, d, wherein $d \equiv e^1 \pmod{\varphi(n)}$, wherein $\varphi(n)=(p-1)(q-1)$ and e is the cryptographic exponent.

Example 59 includes one or more machine-readable storage media comprising a plurality of instructions stored thereon that, when executed, causes a compute device to perform the method of any of Examples 50-58.

Example 60 includes a compute device of a plurality of compute devices for provisioning cryptographic keys onto the compute device, the compute device comprising means for storing cryptographic key components of a Rivest-Shamir-Adleman (RSA) public-private key pair in a hardcoded manner, wherein the cryptographic key components comprises a pair of different prime numbers, p and q, and a modulus, n, of the determined pair of prime numbers, p and q; and means for receiving, from a cryptographic key server, a cryptographic exponent that forms a valid RSA public-private key pair with the cryptographic key components, wherein the cryptographic exponent is unique relative to a corresponding exponent of each other compute device of the plurality of compute devices.

Example 61 includes the subject matter of Example 60, and wherein means for storing the cryptographic key components comprises means for writing the cryptographic key components to a firmware of the compute device.

Example 62 includes the subject matter of any of Examples 60 and 61, and wherein means for storing the cryptographic key components comprises means for writing the cryptographic key components to a one-time-store memory device of the compute device.

Example 63 includes the subject matter of any of Examples 60-62, and wherein means for receiving the cryptographic exponent comprises means for receive signed certificate including the modulus, n, and the cryptographic exponent.

Example 64 includes the subject matter of any of Examples 60-63, and further including means for transmitting an exponent provisioning request to the cryptographic server prior to receiving the cryptographic exponent.

Example 65 includes the subject matter of any of Examples 60-64, and further including means for validating the cryptographic exponent by determining whether a solution exists for $d \equiv e^1 \pmod{\varphi(n)}$, wherein $\varphi(n)=(p-1)(q-1)$ and e is the cryptographic exponent.

Example 66 includes the subject matter of any of Examples 60-65, and further including means for transmitting a notification to the cryptographic key server informing that the provisioning of the cryptographic exponent was unsuccessful in response a determination that the cryptographic exponent is not valid.

Example 67 includes the subject matter of any of Examples 60-66, and further including means for storing, in response to a determination that the cryptographic exponent is valid, the cryptographic exponent in a non-volatile memory of the compute device; and means for transmitting a notification to the cryptographic key server informing that the provisioning of the cryptographic exponent was successful in response to a determination that the cryptographic exponent is valid.

Example 68 includes the subject matter of any of Examples 60-67, and further including means for receiving, from the cryptographic key server, a request for a public key of the compute device; means for retrieving the public key, wherein the public key is formed from the modulus, n, and the cryptographic exponent; means for transmitting the public key to the cryptographic key server; means for receiving, from the cryptographic key server, an encrypted secret, wherein the encrypted secret is encrypted using the public key; and means for decrypting the encrypted secret using a private key, wherein the private key is formed from the modulus, n, and a private exponent, d, wherein $d \equiv e^1 \pmod{\varphi(n)}$, wherein $\varphi(n)=(p-1)(q-1)$ and e is the cryptographic exponent.

The invention claimed is:

1. A cryptographic key server for provisioning cryptographic keys to a plurality of compute devices separate from the cryptographic key server, the cryptographic key server comprising:
a cryptographic component generator to determine (i) cryptographic key components of a Rivest-Shamir-Adleman (RSA) public-private key pair to be hardcoded into each compute device of the plurality of compute devices, wherein the cryptographic key components comprises a pair of different prime numbers, p and q, and a modulus, n, of the determined pair of prime numbers, p and q and (ii) a plurality of cryptographic exponents, wherein each cryptographic exponent forms a valid RSA public-private key pair with the cryptographic key components hardcoded into each compute device of the plurality of compute devices; and
a key provisioner to transmit, over a network external to the cryptographic key server and to each compute device of the plurality of compute devices, a different cryptographic exponent of the determined plurality of cryptographic exponents to be stored on the corresponding compute device;
wherein to determine the plurality of cryptographic exponents comprises to (i) determine, by the cryptographic key server, a potential cryptographic exponent and (ii) validate the determined cryptographic potential exponent by determining whether a solution exists for $d \equiv e^1 \pmod{\varphi(n)}$, wherein $\varphi(n)=(p-1)(q-1)$ and e is the potential cryptographic exponent.

2. The cryptographic key server of claim 1, wherein to determine the plurality of cryptographic exponents comprises to determine an initial cryptographic exponent, wherein the initial cryptographic exponent is an odd integer equal to or greater than 65537.

3. The cryptographic key server of claim 1, further comprising a certificate manager to generate, for each cryptographic exponent of the plurality of cryptographic exponents, a signed certificate including the modulus, n, and the corresponding cryptographic exponent.

4. The cryptographic key server of claim 1, wherein to transmit a different cryptographic exponent of the determined plurality of cryptographic exponents comprises to receive, from each compute device of the plurality of compute devices, an exponent provisioning request for provisioning of a cryptographic exponent.

5. The cryptographic key server of claim 1, wherein the key provisioner is further to identify the plurality of cryptographic exponents for provisioning to the plurality of compute devices based on the cryptographic key components hardcoded in each compute device of the plurality of compute devices.

6. The cryptographic key server of claim 1, further comprising a communicator to receive, from at least one compute device, an indication that the provisioning of a corresponding cryptographic exponent received by the at least one compute device was unsuccessful,
wherein the cryptographic component generator is further to select another cryptographic exponent from the plurality of cryptographic exponents different from the corresponding cryptographic exponent,
and wherein the key provisioner is further to transmit the another cryptographic exponent to the at least one compute device.

7. The cryptographic key server of claim 1, further comprising:
a public key requester to request a public key from a first compute device of the plurality of compute devices;
a communicator to receive, from the first compute device, the public key of the first compute device; and
a secret provisioner to (i) encrypt a first secret unique to the first compute device using the public key of the first compute device and (ii) transmit the encrypted first secret to the first compute device.

8. The cryptographic key server of claim 7, wherein:
the public key requester is further to request a public key from a second compute device of the plurality of compute devices different from the first compute device,
the communicator is further to receive, from the second compute device, the public key of the second compute device, and
the secret provisioner is further to encrypt a second secret unique to the second compute device using the public key of the second compute device and (ii) transmit the encrypted second secret to the second compute device.

9. A method for provisioning cryptographic keys to a plurality of compute devices separate from a cryptographic key server, the method comprising:

determining, by the cryptographic key server, cryptographic key components of a Rivest-Shamir-Adleman (RSA) public-private key pair to be hardcoded into each compute device of the plurality of compute devices, wherein the cryptographic key components comprises a pair of different prime numbers, p and q, and a modulus, n, of the determined pair of prime numbers, p and q;

determining, by the cryptographic key server, a plurality of cryptographic public exponents, e, wherein each cryptographic public exponent forms a valid RSA public-private key pair with the cryptographic key components hardcoded into each compute device of the plurality of compute devices; and transmitting, by the cryptographic key server over a network external to the cryptographic key server and to each compute device of the plurality of compute devices, a different cryptographic exponent of the determined plurality of cryptographic exponents to be stored on the corresponding compute device;

wherein determining the plurality of cryptographic exponents comprises:

determining, by the cryptographic key server, a potential exponent; and validating the determined potential exponent by determining whether a solution exists for $d \equiv e^1 \pmod{\varphi(n)}$, wherein $\varphi(n) = (p-1)(q-1)$.

10. The method of claim 9, wherein determining the plurality of cryptographic exponents comprises determining an initial cryptographic exponent, wherein the initial cryptographic exponent is an odd integer equal to or greater than 65537.

11. The method of claim 9, further comprising generating, by the cryptographic key server and for each cryptographic exponent of the plurality of cryptographic exponents, a signed certificate including the modulus, n, and the corresponding cryptographic exponent.

12. The method of claim 9, further comprising identifying the plurality of cryptographic exponents for provisioning to the plurality of compute devices based on the cryptographic key components hardcoded in each compute device of the plurality of compute devices.

13. The method of claim 9, further comprising:

receiving, by the cryptographic key server and from at least one compute device, an indication that the provisioning of a corresponding cryptographic exponent received by the at least one compute device was unsuccessful;

selecting, by the cryptographic key server, another cryptographic exponent from the plurality of cryptographic exponents different from the corresponding cryptographic exponent; and transmitting, by the cryptographic key server, the another cryptographic exponent to the at least one compute device.

14. The method of claim 9, further comprising:

requesting, by the cryptographic key server, a public key from a first compute device of the plurality of compute devices;

receiving, by the cryptographic key server and from the first compute device, the public key of the first compute device;

encrypting, by the cryptographic key server, a first secret unique to the first compute device using the public key of the first compute device; and transmitting, by the cryptographic key server, the encrypted first secret to the first compute device.

15. The method of claim 14, further comprising:

requesting, by the cryptographic key server, a public key from a second compute device of the plurality of compute devices different from the first compute device;

receiving, by the cryptographic key server and from the second compute device, the public key of the second compute device;

encrypting, by the cryptographic key server, a second secret unique to the second compute device using the public key of the second compute device; and transmitting, by the cryptographic key server, the encrypted second secret to the second compute device.

16. One or more non-transitory, machine-readable storage media comprising a plurality of instructions stored thereon that, when executed, causes a cryptographic key server to:

determine cryptographic key components of a Rivest-Shamir-Adleman (RSA) public-private key pair to be hardcoded into each compute device of a plurality of compute devices, wherein each of the plurality of compute devices is separate from the cryptographic key server and wherein the cryptographic key components comprises a pair of different prime numbers, p and q, and a modulus, n, of the determined pair of prime numbers, p and q;

determine a plurality of cryptographic public exponents, e, wherein each cryptographic public exponent forms a valid RSA public-private key pair with the cryptographic key components hardcoded into each compute device of the plurality of compute devices; and transmit, over a network external to the cryptographic key server and to each compute device of the plurality of compute devices, a different cryptographic exponent of the determined plurality of cryptographic exponents to be stored on the corresponding compute device;

wherein to determine the plurality of cryptographic exponents comprises to:

determine a potential exponent; and validate the determined potential exponent by determining whether a solution exists for $d \equiv e^1 \pmod{\varphi(n)}$, wherein $\varphi(n) = (p-1)(q-1)$.

17. The one or more non-transitory, machine-readable storage media of claim 16, wherein to determine the plurality of cryptographic exponents comprises to determine an initial cryptographic exponent, wherein the initial cryptographic exponent is an odd integer equal to or greater than 65537.

18. The one or more non-transitory, machine-readable storage media of claim 16, wherein the plurality of instructions, when executed, further cause the cryptographic key server to generate, for each cryptographic exponent of the plurality of cryptographic exponents, a signed certificate including the modulus, n, and the corresponding cryptographic exponent.

19. The one or more non-transitory, machine-readable storage media of claim 16, wherein the plurality of instructions, when executed, further cause the cryptographic key server to identify the plurality of cryptographic exponents for provisioning to the plurality of compute devices based on the cryptographic key components hardcoded in each compute device of the plurality of compute devices.

20. The one or more non-transitory, machine-readable storage media of claim 16, wherein the plurality of instructions, when executed, further cause the cryptographic key server to:
- receive, from at least one compute device, an indication that the provisioning of a corresponding cryptographic exponent received by the at least one compute device was unsuccessful;
- select another cryptographic exponent from the plurality of cryptographic exponents different from the corresponding cryptographic exponent; and
- transmit the another cryptographic exponent to the at least one compute device.

21. The one or more non-transitory, machine-readable storage media of claim 16, wherein the plurality of instructions, when executed, further cause the cryptographic key server to:
- request a public key from a first compute device of the plurality of compute devices;
- receive, from the first compute device, the public key of the first compute device;
- encrypt a first secret unique to the first compute device using the public key of the first compute device; and
- transmit the encrypted first secret to the first compute device.

22. The one or more non-transitory, machine-readable storage media of claim 21, wherein the plurality of instructions, when executed, further cause the cryptographic key server to:
- request a public key from a second compute device of the plurality of compute devices different from the first compute device;
- receive, from the second compute device, the public key of the second compute device;
- encrypt a second secret unique to the second compute device using the public key of the second compute device; and
- transmit the encrypted second secret to the second compute device.

* * * * *